(12) United States Patent
Shen et al.

(10) Patent No.: US 12,133,289 B2
(45) Date of Patent: Oct. 29, 2024

(54) DUAL COMMUNICATION CARD-BASED COMMUNICATION METHOD AND DEVICE

(71) Applicant: HUAWEI TECHNOLOGIES CO., LTD., Shenzhen (CN)

(72) Inventors: Li Shen, Shenzhen (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 430 days.

(21) Appl. No.: 17/607,190

(22) PCT Filed: Apr. 22, 2020

(86) PCT No.: PCT/CN2020/086053
§ 371 (c)(1),
(2) Date: Oct. 28, 2021

(87) PCT Pub. No.: WO2020/221077
PCT Pub. Date: Nov. 5, 2020

(65) Prior Publication Data
US 2022/0225081 A1    Jul. 14, 2022

(30) Foreign Application Priority Data

Apr. 30, 2019   (CN) .......................... 201910363323.X

(51) Int. Cl.
*H04W 8/24* (2009.01)
*H04W 8/18* (2009.01)
*H04W 88/06* (2009.01)

(52) U.S. Cl.
CPC .............. *H04W 8/24* (2013.01); *H04W 8/183* (2013.01); *H04W 88/06* (2013.01)

(58) Field of Classification Search
CPC ....................................................... H04W 8/24
(Continued)

(56) References Cited

U.S. PATENT DOCUMENTS

2011/0151930 A1   6/2011  Lee et al.
2012/0142348 A1   6/2012  Park et al.
(Continued)

FOREIGN PATENT DOCUMENTS

CN          101329739 A       12/2008
CN          104684023 A        6/2015
(Continued)

OTHER PUBLICATIONS

Tdoc S2-040326, Nortel Networks et al, Routing of Emergency Calls based on Geographical Coordinates, 3GPP TSG-SA2 Meeting #37, Innsbruck, Austria, Jan. 12-16, 2004, 14 pages.
(Continued)

*Primary Examiner* — Christopher M Crutchfield
*Assistant Examiner* — Jean F Voltaire
(74) *Attorney, Agent, or Firm* — HAUPTMAN HAM, LLP

(57) ABSTRACT

A communication method includes communicating between a terminal device and a first network device via a first uplink capability. The terminal device includes a first communication card and a second communication card. The method also includes sending a first message to the first network device from the terminal device. The first message indicates a second uplink capability to communicate between the terminal device and the first network device. The method additionally includes communicating between the terminal device and a second network device via a third uplink capability.

20 Claims, 15 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2013/0252643 A1* | 9/2013 | Park .................... | H04W 68/025 455/458 |
| 2015/0296520 A1 | 10/2015 | Batchu et al. | |
| 2017/0041823 A1* | 2/2017 | Xie .................... | H04W 28/0247 |
| 2017/0280366 A1* | 9/2017 | Sahu .................... | H04W 8/183 |
| 2018/0146365 A1 | 5/2018 | Dhanapal et al. | |

FOREIGN PATENT DOCUMENTS

| | | |
|---|---|---|
| CN | 104995989 A | 10/2015 |
| CN | 105101081 A | 11/2015 |
| CN | 105263186 A | 1/2016 |
| CN | 106465134 A | 2/2017 |
| CN | 106470060 A | 3/2017 |
| CN | 107333257 A | 11/2017 |
| CN | 107396435 A | 11/2017 |
| CN | 107646203 A | 1/2018 |

OTHER PUBLICATIONS

Chinese Notice of Allowance issued in corresponding Chinese Application No. 201910363323.X, dated Mar. 22, 2022, pp. 1-4.
International Search Report issued in corresponding International Application No. PCT/CN2020/086053, dated Jul. 21, 2020, pp. 1-9.
Chinese Office Action issued in corresponding Chinese Application No. 201910363323.X, dated Mar. 3, 2021, pp. 1-23.
Chinese Office Action issued in corresponding Chinese Application No. 201910363323.X, dated Nov. 9, 2021, pp. 1-9.
Holma Harri et al: "Performance" In: "Performance", Mar. 4, 2011 (Mar. 4, 2011), XP055956396, DOI: 10.1002/9781119992943.ch10.
LG Electronics: "Discussion on the solution for enabling eDRXthrough TAU Reject with T3346",3GPP Draft; C1-154371; Nov. 16, 2015, XP050997694.
Extended European Search Report issued in corresponding European Application No. 20798890.8, dated Sep. 13, 2022, pp. 1-9.

\* cited by examiner

DUAL COMMUNICATION CARD-BASED COMMUNICATION METHOD AND DEVICE

CROSS-REFERENCE TO RELATED APPLICATIONS

This application is a National Stage of International Application No. PCT/CN2020/086053, filed on Apr. 22, 2020, which claims priority to Chinese Patent Application No. 201910363323.X, filed on Apr. 30, 2019, both of which are hereby incorporated by reference in their entireties.

TECHNICAL FIELD

This application relates to terminal technologies, and in particular, to a dual communication card-based communication method and a device.

BACKGROUND

With the development of terminal technologies, a dual-card terminal device starts to be applied. Two communication cards are disposed in the dual-card terminal device. A user may use the two communication cards in the dual-card terminal device to perform communication. For the dual-card terminal device, the two communication cards can simultaneously perform communication services.

In the conventional technology, for the dual-card terminal device, if the two communication cards need to simultaneously perform communication services, an independent radio frequency link needs to be set for each of the two communication cards in the terminal device. Further, the two communication cards in the terminal device may use respective corresponding radio frequency links, to implement simultaneous communication.

However, in the conventional technology, if an independent radio frequency link needs to be set for each of the two communication cards in the terminal device, more radio frequency links need to be disposed in the terminal device. As a result, costs of the terminal device are high.

SUMMARY

This application provides a dual communication card-based communication method and a device, to resolve a problem in the conventional technology that costs of a terminal device are high because when communication cards in a dual-card terminal device simultaneously perform communication, an independent radio frequency link needs to be set for each communication card in the terminal device.

According to a first aspect, this application provides a dual communication card-based communication method. The method is applied to a terminal device. A first communication card and a second communication card are disposed in the terminal device. The method includes:

The terminal device communicates with a first network device by using a first uplink capability, where in this case, the first communication card of the terminal device is in a communication state; when the terminal device determines that an uplink capability needs to be adjusted, the terminal device sends a first message to the first network device, where the first message is used to indicate a second uplink capability that is used by the terminal device to communicate with the first network device and that is different from the first uplink capability; and the second communication card communicates with the first network device through the terminal device by using the second uplink capability, and the second communication card communicates with a second network device through the terminal device by using a third uplink capability.

Therefore, when the first communication card of the terminal device is in a communication state and the second communication card of the terminal device is in a wait state, the terminal device interacts with the network devices, to adjust an uplink capability corresponding to the first communication card to the second uplink capability, and an uplink capability is configured for the second communication card, so that both the first communication card and the second communication card in the terminal device are in a communication state, to implement dual SIM dual activation. Therefore, a dual SIM and dual active function of the terminal device is implemented, and a redundant radio frequency link does not need to be configured for the terminal device, so that costs of the terminal device are reduced. In addition, when both the first communication card and the second communication card of the terminal device are in a communication state, the uplink capability corresponding to the first communication card is adjusted to the second uplink capability, and an uplink capability previously configured for the first communication card is returned to the second communication card. In this way, the first communication card and the second communication card are restored to a previous communication state, so that the first communication card of the terminal device is in a wait state, and the second communication card of the terminal device is in a communication state.

In a possible implementation, the second uplink capability is less than the first uplink capability. In this case, an uplink capability between the terminal device and the first network device is reduced.

In a possible implementation, after the terminal device sends the first message to the first network device, the first network device adjusts the uplink capability used by the terminal device to communicate with the first network device from the first uplink capability to the second uplink capability. Then, the method further includes: The terminal device sends a second message to the second network device, where the second message is used to indicate the third uplink capability used by the terminal device to communicate with the second network device. Optionally, the first message includes the second uplink capability, or the first message indicates the second uplink capability.

Therefore, the terminal device separately interacts with the first network device and the second network device, to adjust uplink capabilities respectively corresponding to the first communication card and the second communication card.

In a possible implementation, the terminal device may further send a time parameter of the second uplink capability to the first network device, that is, the terminal device sends a first time parameter to the first network device. Therefore, the first network device adjusts the uplink capability between the terminal device and the first network device to the second uplink capability at a time point indicated by the first time parameter. Then, the terminal device communicates with the first network device by using the second uplink capability at the time point indicated by the first time parameter.

In a possible implementation, the terminal device may further send a time parameter of the third uplink capability to the second network device, that is, the terminal device sends a second time parameter to the second network device. Therefore, the second network device adjusts an uplink capability between the terminal device and the second network device to the third uplink capability at a time point indicated by the second time parameter. Then, the terminal device communicates with the second network device by using the third uplink capability at the time point indicated by the second time parameter.

In a possible implementation, the terminal device may send a parameter of a subframe of the second uplink capability to the first network device, that is, the terminal device sends a first subframe parameter to the first network device; or, the terminal device sends a parameter of a timeslot of the second uplink capability to the first network device, that is, the terminal device sends a first timeslot parameter to the first network device. Therefore, the terminal device may communicate with the first network device by using the second uplink capability in a subframe indicated by the terminal device or in a timeslot indicated by the terminal device.

In a possible implementation, the method further includes: The terminal device may send a parameter of a subframe of the third uplink capability to the second network device, that is, the terminal device sends a second subframe parameter to the second network device; or, the terminal device sends a parameter of a timeslot of the third uplink capability to the second network device, that is, the terminal device sends a second timeslot parameter to the second network device. Therefore, the terminal device may communicate with the second network device by using the third uplink capability in a subframe indicated by the terminal device or in a timeslot indicated by the terminal device.

In a possible implementation, the first uplink capability is N uplink radio frequency link capabilities. For example, a quantity of uplink radio frequency links of the first communication card in the terminal device is N. The second uplink capability is M uplink radio frequency link capabilities. In this case, the terminal device needs to adjust the quantity of the uplink radio frequency links of the first communication card to M. The second network device adjusts an uplink capability used for communication between the terminal device and the second network device to the third uplink capability, and the third uplink capability is N-M-P uplink radio frequency link capabilities. In this case, the terminal device needs to adjust a quantity of uplink radio frequency links of the second communication card to N-M-P, where N is a positive integer greater than or equal to 2, M is a positive integer greater than or equal to 1, M is less than N, and P is an integer greater than or equal to 0 and less than N-M. Therefore, when the terminal device interacts with the network device to adjust the uplink capabilities, the terminal device adjusts the quantities of the uplink radio frequency links respectively corresponding to the first communication card and the second communication card, to implement an objective of dual-card communication.

In a possible implementation, the first communication card corresponds to the first uplink capability and the second uplink capability, and the second communication card corresponds to the third uplink capability.

In a possible implementation, the first network device and the second network device are a same network device, or the first network device and the second network device are different network devices.

According to a second aspect, this application provides a dual communication card-based communication method, including:

A terminal device communicates with a network device by using a first uplink capability, where in this case, a first communication card of the terminal device is in a communication state, that is, communication is performed between the network device and the terminal device by using the first uplink capability, and the first communication card and a second communication card are disposed in the terminal device; and when the terminal device determines that an uplink capability needs to be adjusted, the network device receives a first message sent by the terminal device, where the first message is used to indicate a second uplink capability that is used by the terminal device to communicate with the network device and that is different from the first uplink capability.

Therefore, when the first communication card of the terminal device is in a communication state and the second communication card of the terminal device is in a wait state, the terminal device interacts with the network devices, to adjust an uplink capability corresponding to the first communication card to the second uplink capability, and an uplink capability is configured for the second communication card, so that both the first communication card and the second communication card in the terminal device are in a communication state, to implement dual SIM dual activation. Therefore, a dual SIM and dual active function of the terminal device is implemented, and a redundant radio frequency link does not need to be configured for the terminal device, so that costs of the terminal device are reduced. In addition, when both the first communication card and the second communication card of the terminal device are in a communication state, the uplink capability corresponding to the first communication card is adjusted to the second uplink capability, and an uplink capability previously configured for the first communication card is returned to the second communication card. In this way, the first communication card and the second communication card are restored to a previous communication state, so that the first communication card of the terminal device is in a wait state, and the second communication card of the terminal device is in a communication state.

In a possible implementation, the second uplink capability is less than the first uplink capability. In this case, an uplink capability between the terminal device and the network device is reduced.

In a possible implementation, the network device may receive a time parameter that is of the second uplink capability and that is sent by the terminal device, that is, the network device receives a first time parameter sent by the terminal device. Therefore, the network device adjusts the uplink capability between the terminal device and the network device to the second uplink capability at a time point indicated by the first time parameter. Then, the terminal device communicates with the network device by using the second uplink capability at the time point indicated by the first time parameter.

In a possible implementation, the network device may receive a parameter that is of a subframe of the second uplink capability and that is sent by the terminal device, that is, the network device receives a first subframe parameter sent by the terminal device; or, the network device may receive a parameter that is of a timeslot of the second uplink capability and that is sent by the terminal device, that is, the network device receives a first timeslot parameter sent by the terminal device. Therefore, the terminal device may communicate with the network device by using the second uplink capability in a subframe indicated by the terminal device or in a timeslot indicated by the terminal device.

In a possible implementation, the network device communicates with the terminal device by using a third uplink capability that is different from the first uplink capability. In this case, the second communication card communicates with the network device through the terminal device by using the third uplink capability.

In a possible implementation, to enable the network device to communicate with the terminal device by using the third uplink capability, the terminal device may indicate the third uplink capability. Therefore, the network device receives a second message that is sent by the terminal device and that is used to indicate the third uplink capability.

In a possible implementation, the network device may receive a time parameter that is of the third uplink capability and that is sent by the terminal device, that is, the network device receives a second time parameter sent by the terminal device. Therefore, the network device adjusts the uplink capability between the terminal device and the network device to the third uplink capability at a time point indicated by the second time parameter. Then, the terminal device communicates with the network device by using the third uplink capability at the time point indicated by the second time parameter.

In a possible implementation, the network device may receive a parameter that is of a subframe of the third uplink capability and that is sent by the terminal device, that is, the network device receives a second subframe parameter sent by the terminal device; or, the network device may receive a parameter that is of a timeslot of the third uplink capability and that is sent by the terminal device, that is, the network device receives a second timeslot parameter sent by the terminal device. Therefore, the terminal device may communicate with the network device by using the third uplink capability in a subframe indicated by the terminal device or in a timeslot indicated by the terminal device.

In a possible implementation, the first uplink capability is N uplink radio frequency link capabilities. For example, a quantity of uplink radio frequency links of the first communication card in the terminal device is N. The second uplink capability is M uplink radio frequency link capabilities. In this case, the terminal device needs to adjust the quantity of the uplink radio frequency links of the first communication card to M. The network device adjusts the uplink capability used for communication between the terminal device and the network device to the third uplink capability, and the third uplink capability is N-M-P uplink radio frequency link capabilities. In this case, the terminal device needs to adjust a quantity of uplink radio frequency links of the second communication card to N-M-P, where N is a positive integer greater than or equal to 2, M is a positive integer greater than or equal to 1, M is less than N, and P is an integer greater than or equal to 0 and less than N-M. Therefore, when the terminal device interacts with the network device to adjust the uplink capabilities, the terminal device adjusts the quantities of the uplink radio frequency links respectively corresponding to the first communication card and the second communication card, to implement an objective of dual-card communication.

According to a third aspect, this application provides a dual communication card-based communications apparatus. The apparatus is applied to a terminal device. A first communication card and a second communication card are disposed in the terminal device. The apparatus includes a communications module. The communications module is configured to perform any method in the first aspect.

According to a fourth aspect, this application provides a dual communication card-based communications apparatus. The apparatus includes a communications module. The communications module is configured to perform any method in the second aspect.

According to a fifth aspect, this application provides a terminal device, including a transmitter, a receiver, a memory, and a processor. The memory is configured to store computer instructions.

The transmitter and the receiver are configured to communicate with a first network device by using a first uplink capability. In this case, a first communication card of the terminal device is in a communication state. When the terminal device determines that an uplink capability needs to be adjusted, the transmitter sends a first message to the first network device, where the first message is used to indicate a second uplink capability that is used by the terminal device to communicate with the first network device and that is different from the first uplink capability. A second communication card communicates with the first network device through the transmitter and the receiver by using the second uplink capability, and the second communication card communicates with a second network device through the transmitter and the receiver by using a third uplink capability.

Therefore, when the first communication card of the terminal device is in a communication state and the second communication card of the terminal device is in a wait state, the terminal device interacts with the network devices, to adjust an uplink capability corresponding to the first communication card to the second uplink capability, and an uplink capability is configured for the second communication card, so that both the first communication card and the second communication card in the terminal device are in a communication state, to implement dual SIM dual activation. Therefore, a dual SIM and dual active function of the terminal device is implemented, and a redundant radio frequency link does not need to be configured for the terminal device, so that costs of the terminal device are reduced. In addition, when both the first communication card and the second communication card of the terminal device are in a communication state, the uplink capability corresponding to the first communication card is adjusted to the second uplink capability, and an uplink capability previously configured for the first communication card is returned to the second communication card. In this way, the first communication card and the second communication card are restored to a previous communication state, so that the first communication card of the terminal device is in a wait state, and the second communication card of the terminal device is in a communication state.

In a possible implementation, the second uplink capability is less than the first uplink capability. In this case, an uplink capability between the terminal device and the first network device is reduced.

In a possible implementation, after the transmitter sends the first message to the first network device, the first network device adjusts the uplink capability used by the terminal device to communicate with the first network device from the first uplink capability to the second uplink capability. Then, the method further includes: The transmitter sends a second message to the second network device, where the second message is used to indicate the third uplink capability used by the terminal device to communicate with the second network device. Optionally, the first message includes the second uplink capability, or the first message indicates the second uplink capability.

Therefore, the terminal device separately interacts with the first network device and the second network device, to adjust uplink capabilities respectively corresponding to the first communication card and the second communication card.

In a possible implementation, the transmitter may further send a time parameter of the second uplink capability to the first network device, that is, the transmitter sends a first time parameter to the first network device. Therefore, the first network device adjusts the uplink capability between the terminal device and the first network device to the second uplink capability at a time point indicated by the first time parameter. Then, the transmitter and the receiver communicate with the first network device by using the second uplink capability at the time point indicated by the first time parameter.

In a possible implementation, the transmitter may further send a time parameter of the third uplink capability to the second network device, that is, the transmitter sends a second time parameter to the second network device. Therefore, the second network device adjusts an uplink capability between the terminal device and the second network device to the third uplink capability at a time point indicated by the second time parameter. Then, the transmitter and the receiver communicate with the second network device by using the third uplink capability at the time point indicated by the second time parameter.

In a possible implementation, the transmitter may send a parameter of a subframe of the second uplink capability to the first network device, that is, the transmitter sends a first subframe parameter to the first network device; or, the transmitter sends a parameter of a timeslot of the second uplink capability to the first network device, that is, the transmitter sends a first timeslot parameter to the first network device. Therefore, the transmitter and the receiver may communicate with the first network device by using the second uplink capability in a subframe indicated by the terminal device or in a timeslot indicated by the terminal device.

In a possible implementation, the transmitter may send a parameter of a subframe of the third uplink capability to the second network device, that is, the transmitter sends a second subframe parameter to the second network device; or, the transmitter may send a parameter of a timeslot of the third uplink capability to the second network device, that is, the transmitter sends a second timeslot parameter to the second network device. Therefore, the transmitter and the receiver may communicate with the second network device by using the third uplink capability in a subframe indicated by the terminal device or in a timeslot indicated by the terminal device.

In a possible implementation, the first uplink capability is N uplink radio frequency link capabilities. For example, a quantity of uplink radio frequency links of the first communication card in the terminal device is N. The second uplink capability is M uplink radio frequency link capabilities. In this case, the processor needs to adjust the quantity of the uplink radio frequency links of the first communication card to M. The second network device adjusts the uplink capability used for communication between the terminal device and the second network device to the third uplink capability, and the third uplink capability is N-M-P uplink radio frequency link capabilities. In this case, the processor needs to adjust a quantity of uplink radio frequency links of the second communication card to N-M-P, where N is a positive integer greater than or equal to 2, M is a positive integer greater than or equal to 1, M is less than N, and P is an integer greater than or equal to 0 and less than N-M. Therefore, when the terminal device interacts with the network devices to adjust the uplink capabilities, the terminal device adjusts the quantities of the uplink radio frequency links respectively corresponding to the first communication card and the second communication card, to implement an objective of dual-card communication.

In a possible implementation, the first communication card corresponds to the first uplink capability and the second uplink capability, and the second communication card corresponds to the third uplink capability.

In a possible implementation, the first network device and the second network device are a same network device, or the first network device and the second network device are different network devices.

According to a sixth aspect, this application provides a terminal device, including at least one processing element or chip configured to perform any implementation in the first aspect.

According to a seventh aspect, this application provides a program, and the program is used to perform any implementation in the first aspect when being executed by a processor.

According to an eighth aspect, this application provides a computer-readable storage medium, including the program in the seventh aspect.

According to a ninth aspect, this application provides a network device, including a transmitter, a receiver, a memory, and a processor. The memory is configured to store computer instructions.

The transmitter and the receiver communicate with a terminal device by using a first uplink capability. In this case, a first communication card of the terminal device is in a communication state, that is, communication is performed between the network device and the terminal device by using the first uplink capability. The first communication card and a second communication card are disposed in the terminal device. When the terminal device determines that an uplink capability needs to be adjusted, the receiver receives a first message sent by the terminal device, where the first message is used to indicate a second uplink capability that is used by the terminal device to communicate with the network device and that is different from the first uplink capability.

Therefore, when the first communication card of the terminal device is in a communication state and the second communication card of the terminal device is in a wait state, the terminal device interacts with the network devices, to adjust an uplink capability corresponding to the first communication card to the second uplink capability, and an uplink capability is configured for the second communication card, so that both the first communication card and the second communication card in the terminal device are in a communication state, to implement dual SIM dual activation. Therefore, a dual SIM and dual active function of the terminal device is implemented, and a redundant radio frequency link does not need to be configured for the terminal device, so that costs of the terminal device are reduced. In addition, when both the first communication card and the second communication card of the terminal device are in a communication state, the uplink capability corresponding to the first communication card is adjusted to the second uplink capability, and an uplink capability previously configured for the first communication card is returned to the second communication card. In this way, the first communication card and the second communication card are restored to a previous communication state, so that the first communication card of the terminal device is in a wait state, and the second communication card of the terminal device is in a communication state.

In a possible implementation, the second uplink capability is less than the first uplink capability. In this case, an uplink capability between the terminal device and the network device is reduced.

In a possible implementation, the receiver may receive a time parameter that is of the second uplink capability and that is sent by the terminal device, that is, the receiver receives a first time parameter sent by the terminal device. Therefore, the processor adjusts the uplink capability between the terminal device and the network device to the second uplink capability at a time point indicated by the first time parameter. Then, the terminal device communicates with the network device by using the second uplink capability at the time point indicated by the first time parameter.

In a possible implementation, the receiver may receive a parameter that is of a subframe of the second uplink capability and that is sent by the terminal device, that is, the receiver receives a first subframe parameter sent by the terminal device; or, the receiver may receive a parameter that is of a timeslot of the second uplink capability and that is sent by the terminal device, that is, the receiver receives a first timeslot parameter sent by the terminal device. Therefore, the terminal device may communicate with the network device by using the second uplink capability in a subframe indicated by the terminal device or in a timeslot indicated by the terminal device.

In a possible implementation, the transmitter and the receiver are further configured to communicate with the terminal device by using a third uplink capability that is different from the first uplink capability. In this case, the second communication card communicates with the network device through the terminal device by using the third uplink capability.

In a possible implementation, to enable the network device to communicate with the terminal device by using the third uplink capability, the terminal device may indicate the third uplink capability. Therefore, the receiver receives a second message that is sent by the terminal device and that is used to indicate the third uplink capability.

In a possible implementation, the receiver may receive a time parameter that is of the third uplink capability and that is sent by the terminal device, that is, the receiver receives a second time parameter sent by the terminal device. Therefore, the processor adjusts the uplink capability between the terminal device and the network device to the third uplink capability at a time point indicated by the second time parameter. Then, the terminal device communicates with the network device by using the third uplink capability at the time point indicated by the second time parameter.

In a possible implementation, the receiver may receive a parameter that is of a subframe of the third uplink capability and that is sent by the terminal device, that is, the receiver receives a second subframe parameter sent by the terminal device; or, the receiver may receive a parameter that is of a timeslot of the third uplink capability and that is sent by the terminal device, that is, the receiver receives a second timeslot parameter sent by the terminal device. Therefore, the terminal device may communicate with the network device by using the third uplink capability in a subframe indicated by the terminal device or in a timeslot indicated by the terminal device.

In a possible implementation, the first uplink capability is N uplink radio frequency link capabilities. For example, a quantity of uplink radio frequency links of the first communication card in the terminal device is N. The second uplink capability is M uplink radio frequency link capabilities. In this case, the terminal device needs to adjust the quantity of the uplink radio frequency links of the first communication card to M. The network device adjusts the uplink capability used for communication between the terminal device and the network device to the third uplink capability, and the third uplink capability is N-M-P uplink radio frequency link capabilities. In this case, the terminal device needs to adjust a quantity of uplink radio frequency links of the second communication card to N-M-P, where N is a positive integer greater than or equal to 2, M is a positive integer greater than or equal to 1, M is less than N, and P is an integer greater than or equal to 0 and less than N-M. Therefore, when the terminal device interacts with the network device to adjust the uplink capabilities, the terminal device adjusts the quantities of the uplink radio frequency links respectively corresponding to the first communication card and the second communication card, to implement an objective of dual-card communication.

According to a tenth aspect, this application provides a network device, including at least one processing element or chip configured to perform any implementation in the first aspect.

According to an eleventh aspect, this application provides a program product, and the program product is used to perform any implementation in the first aspect when being executed by a processor.

According to a twelfth aspect, this application provides a computer-readable storage medium, including the program in the eleventh aspect.

According to a thirteenth aspect, this application provides a communications system, including the terminal device provided in the fifth aspect and the network device provided in the ninth aspect.

DESCRIPTION OF EMBODIMENTS

Figure 1:
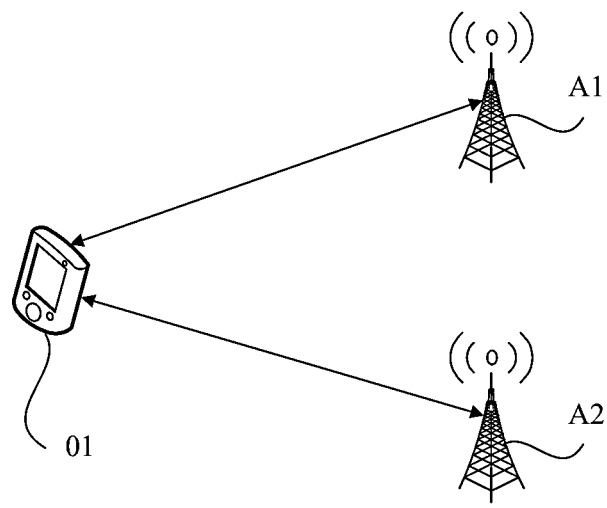
FIG. 1 is a schematic diagram 1 of an application scenario according to an embodiment of this application.

Embodiments of this application are applied to a $5^{th}$ generation communications network ($5^{th}$-generation, 5G) mobile communications system or another system that may appear in the future, or may be applied to another communication system, for example, a wireless local area network communications (wireless local area network, WLAN) system, a global system for mobile communications (global system of mobile communication, GSM) system, a code division multiple access (code division multiple access, CDMA) system, a wideband code division multiple access (wideband code division multiple access, WCDMA) system, a general packet radio service (general packet radio service, GPRS), a long term evolution (long term evolution, LTE) system, an LTE frequency division duplex (frequency division duplex, FDD) system, an LTE time division duplex (time division duplex, TDD), a universal mobile telecommunications system (universal mobile telecommunication system, UMTS), or a worldwide interoperability for microwave access (worldwide interoperability for microwave access, WiMAX) communications system.

The following describes some terms in this application, to facilitate understanding of a person skilled in the art. It should be noted that, when solutions in the embodiments of this application are applied to the 5G system, an existing system, or another system that may appear in the future, names of a network device and a terminal device may change, but this does not affect implementation of the solutions in the embodiments of this application.

(1) A terminal device is a device that provides voice and/or data connectivity for a user. The terminal device in this application mainly refers to but is not limited to a vehicle terminal, a vehicle-mounted terminal, a vehicle device, a mobile terminal, a common terminal, or the like. The vehicle-mounted terminal includes but is not limited to a vehicle-mounted navigator or the like, and the mobile terminal includes but is not limited to a mobile phone, a wearable device, a tablet computer, or the like.

(2) A network device, also referred to as a radio access network (radio access network, RAN) device, is a device for connecting a terminal device to a wireless network, and includes devices in various communications standards. For example, the network device includes but is not limited to a transmission reception point (transmission reception point, TRP), a base station (for example, a gNB), a radio network controller (radio network controller, RNC), a NodeB (Node B, NB), a base station controller (base station controller, BSC), a BTS (base transceiver station), a HeNB (home evolved NodeB) or a HNB (home NodeB), a baseband unit (baseband unit, BBU), and the like.

(3) "A plurality of" means two or more, and another quantifier is similar to this. The term "and/or" describes an association between associated objects and indicates that three relationships may exist. For example, A and/or B may indicate the following three cases: Only A exists, both A and B exist, and only B exists. The character "/" usually indicates an "or" relationship between the associated objects.

(4) "Correspondence" may refer to an association relationship or a binding relationship, and that A corresponds to B refers to an association relationship or a binding relationship between A and B.

It should be noted that nouns or terms used in the embodiments of this application may be mutually referenced, and details are not described again.

FIG. 1 is a schematic diagram 1 of an application scenario according to an embodiment of this application. A networking architecture shown in FIG. 1 mainly includes a terminal device 01, a network device A1, and a network device A2. Two communication cards, namely, a first communication card and a second communication card, are disposed in the terminal device 01. The first communication card is a primary card of the terminal device 01, and the second communication card is a secondary card of the terminal device 01. The first communication card communicates with the network device A1 through the terminal device 01, and the second communication card communicates with the network device A2 through the terminal device 01. The network device A1 and the network device A2 are different network devices.

Figure 2:
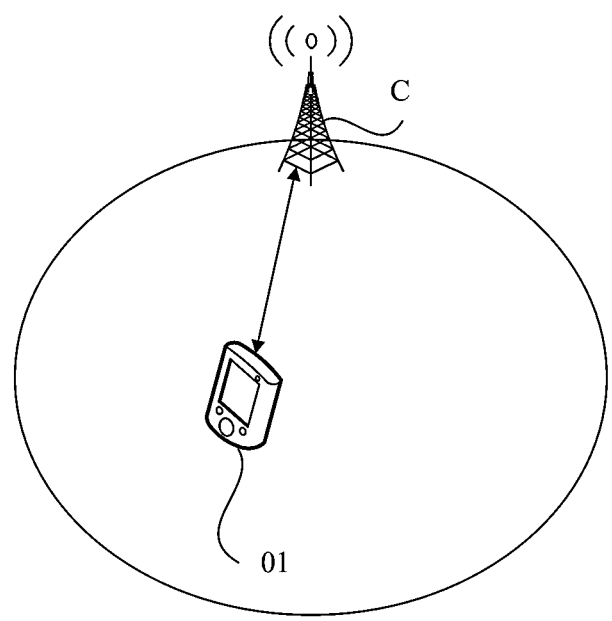
FIG. 2 is a schematic diagram 2 of an application scenario according to an embodiment of this application.

FIG. 2 is a schematic diagram 2 of an application scenario according to an embodiment of this application. A networking architecture shown in FIG. 2 mainly includes a terminal device 01 and a network device C. Two communication cards, namely, a first communication card and a second communication card, are disposed in the terminal device 01. The first communication card is a primary card of the terminal device 01, and the second communication card is a secondary card of the terminal device 01. The first communication card communicates with the network device C through the terminal device 01, and the second communication card communicates with the network device C through the terminal device 01.

With the development of terminal technologies, a dual-card terminal device starts to be applied. Two communication cards are disposed in the dual-card terminal device. A utilization rate of the dual-card terminal device is high. A user may use the two communication cards in the dual-card terminal device to perform communication. For the dual-card terminal device, the two communication cards can simultaneously perform communication services.

For the dual-card terminal device, this application relates to the following several communication modes.

In a first communication mode, the terminal device may perform communication in a dual SIM and dual active (dual SIM and dual active, DSDA) mode. In this mode, the two communication cards may simultaneously perform communication services, and the communication service of one communication card does not affect the communication service of the other communication card. However, in this mode, an independent radio frequency link needs to be set for each of the two communication cards. Therefore, more radio frequency links need to be disposed in the terminal device. As a result, costs of the terminal device are high. The radio frequency link includes an amplifier (PA).

In a second communication mode, the terminal device may perform communication in a dual SIM dual standby (dual SIM dual standby 1.0, DSDS) 1.0 mode. In this mode, the two communication cards cannot simultaneously perform communication services, and the communication service of one communication card affects the communication service of the other communication card. When one communication card performs voice communication, the other communication card cannot perform a communication service. When one communication card performs data communication, the other communication card periodically interrupts a process of the data communication in a discontinuous reception (discontinuous reception, DRX) manner. Therefore, in this mode, the two communication cards in the terminal device cannot simultaneously perform communication services.

In a third communication mode, the terminal device may perform communication in a DSDS 2.0 mode. In this mode, one communication card can periodically perform a communication service in the DRX manner, and the other communication card can simultaneously perform data communication. Periodic communication of one communication card does not affect the data communication of the other communication card. However, in this mode, one of the two communication cards can only perform periodic communication, and the two communication cards cannot actually perform communication services simultaneously.

In a fourth communication mode, the terminal device may perform communication in a DSDS 3.X mode. In this mode, on the basis of DSDS 2.0, when the terminal device is in a standby mode, one communication card performs voice communication, and the other communication card can receive an incoming call; or, one communication card performs voice communication, and the other communication card can perform data communication (for example, Internet access). However, in this mode, a radio frequency link in the terminal device needs to be shared in a time division manner. In addition, only one communication card can perform voice communication, and the other communication card can perform data communication. In a time division process, if the network device cannot learn a communication status of a communication card in the terminal device, a link bit error is caused, then a communication service of the terminal device is interrupted, and then a high throughput rate of data is affected.

In the foregoing communication modes, more radio frequency links need to be disposed in the terminal device, and consequently, the costs of the terminal device are high; or, the two communication cards cannot actually perform communication services simultaneously. Therefore, a communication process of the terminal device is affected, and user experience is affected.

Figure 3:
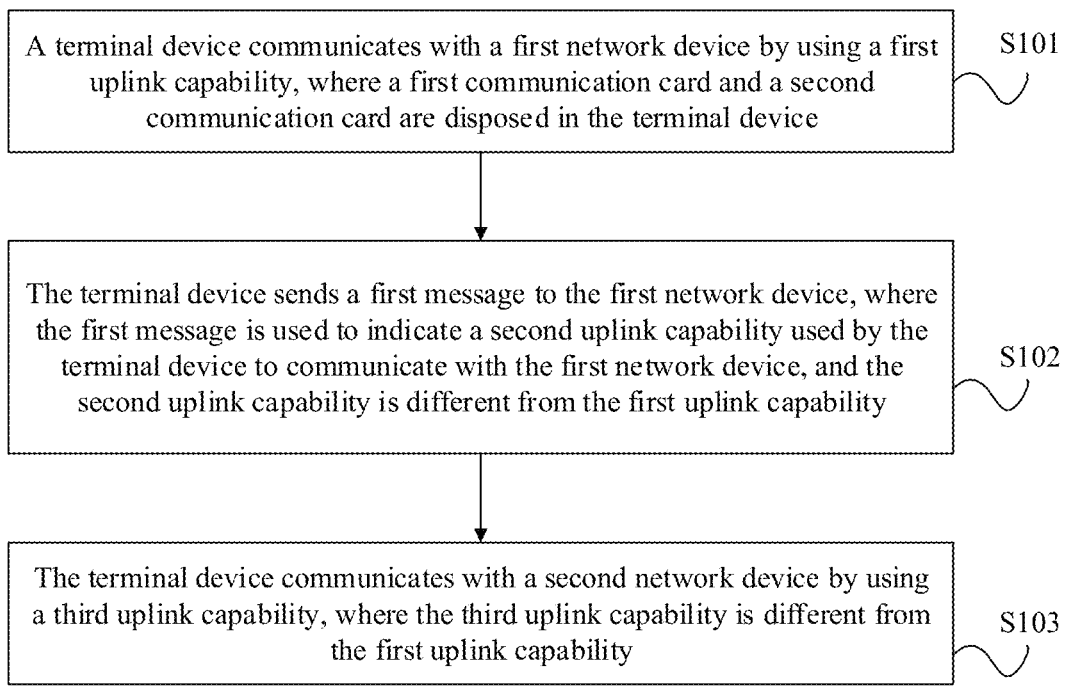
FIG. 3 is a schematic flowchart of a dual communication card-based communication method according to an embodiment of this application.

FIG. 3 is a schematic flowchart of a dual communication card-based communication method according to an embodiment of this application. As shown in FIG. 3, the method includes the following steps.

S101: A terminal device communicates with a first network device by using a first uplink capability. A first communication card and a second communication card are disposed in the terminal device.

For example, at least two communication cards are disposed in the terminal device, and the at least two communication cards include the first communication card and the second communication card. The first communication card is any one of the following: a Mini-subscriber identity module (subscriber identification module, SIM) card, a Micro-SIM card, a Nano-SIM card, a standard (standard) SIM card, an embedded SIM (eSIM) card, or a soft (Soft)-SIM card. The second communication card is any one of the following: a Mini-SIM card, a Micro-SIM card, a Nano-SIM card, a standard SIM card, an eSIM card, or a Soft-SIM card.

The first communication card of the terminal device is in a communication state, for example, performing voice communication or data communication. In this case, the terminal device communicates with the first network device by using the first uplink capability.

S102: The terminal device sends a first message to the first network device, where the first message is used to indicate a second uplink capability used by the terminal device to communicate with the first network device, and the second uplink capability is different from the first uplink capability.

For example, when the terminal device determines that an uplink capability needs to be adjusted, the terminal device sends the first message to the first network device. The first message may be any one or more of the following: radio resource control (radio resource control, RRC) signaling, medium access control-control element (medium access control-control element, MAC-CE) signaling, and downlink control information (downlink control information, DCI) signaling. The first message includes the second uplink capability, or the first message indicates the second uplink capability. The second uplink capability is an uplink capability used by the terminal device to communicate with the first network device.

In addition, a value of the second uplink capability is different from a value of the first uplink capability.

Optionally, the second uplink capability is less than the first uplink capability. In this case, an uplink capability between the terminal device and the first network device is reduced. For example, when the first communication card corresponds to the first network device and the second communication card corresponds to a second network device, an uplink capability corresponding to the first communication card is reduced. When the first communication card corresponds to the second network device and the second communication card corresponds to the first network device, an uplink capability corresponding to the second communication card is reduced.

Optionally, the second uplink capability is greater than the first uplink capability. In this case, the uplink capability between the terminal device and the first network device is improved. For example, when the first communication card corresponds to the first network device and the second communication card corresponds to the second network device, the uplink capability corresponding to the first communication card is improved. When the first communication card corresponds to the second network device and the second communication card corresponds to the first network device, the uplink capability corresponding to the second communication card is improved.

S103: The terminal device communicates with the second network device by using a third uplink capability, where the third uplink capability is different from the first uplink capability.

Optionally, the first communication card corresponds to the first uplink capability and the second uplink capability, and the second communication card corresponds to the third uplink capability.

For example, after the foregoing process, the second communication card of the terminal device is in a communication state such as performing voice communication or data communication. In this case, the terminal device communicates with the second network device by using the third uplink capability. The second network device and the first network device may be a same network device, or the second network device and the first network device are different network devices.

In addition, a value of the third uplink capability is different from the value of the first uplink capability.

Optionally, the second uplink capability is less than the first uplink capability, and the third uplink capability is less than the first uplink capability; or, the second uplink capability is less than the first uplink capability, and the third uplink capability is greater than the first uplink capability. In the foregoing two cases, the uplink capability between the terminal device and the first network device is reduced, and an uplink capability configured between the terminal device and the second network device is the third uplink capability. For example, when the first communication card corresponds to the first network device and the second communication card corresponds to the second network device, the uplink capability corresponding to the first communication card is reduced, and the third uplink capability is configured for the second communication card. For another example, when the first communication card corresponds to the second network device and the second communication card corresponds to the first network device, the uplink capability corresponding to the second communication card is reduced, and the third uplink capability is configured for the second communication card.

Optionally, the second uplink capability is greater than the first uplink capability, and the third uplink capability is less than the first uplink capability; or, the second uplink capability is greater than first uplink capability, and the third uplink capability is greater than the first uplink capability. In the foregoing two cases, the uplink capability between the terminal device and the first network device is improved, and the uplink capability configured between the terminal device and the second network device is the third uplink capability. For example, when the first communication card corresponds to the first network device and the second communication card corresponds to the second network device, the uplink capability corresponding to the first communication card is improved, and the third uplink capability is configured for the second communication card. For another example, when the first communication card corresponds to the second network device and the second communication card corresponds to the first network device, the uplink capability corresponding to the second communication card is improved, and the third uplink capability is configured for the second communication card.

In addition, communications networks of the first communication card and the second communication card may be any one of the following: wireless fidelity (wireless fidelity, wifi), 5G, or the $4^{th}$ generation mobile communication technology (the $4^{th}$ Generation mobile communication technology, 4G), and the $3^{rd}$ generation mobile communication technology (the 3th Generation mobile communication technology, 3G).

In addition, the communications networks of the first communication card and the second communication card may be any one of the following: a new radio standalone (new radio standalone, NR SA) communication mode and a time division multiplexing (time division multiplexing, TDM) communication mode.

Scenarios related to the foregoing steps include the following scenarios:

Scenario 1: The first communication card of the terminal device is in a communication state, and the second communication card of the terminal device is in a wait state. For example, the first communication card is a primary card, and the second communication card is a secondary card. Then, the terminal device receives a trigger message sent by the second network device, where the trigger message is used to indicate that the second communication card needs to perform communication. In this case, an uplink capability needs to be configured for the second communication card, so that both the first communication card and the second communication card in the terminal device are in a communication state, to implement dual SIM dual activation.

In the first scenario, first, in this case, the terminal device communicates with the first network device by using the first uplink capability, to be specific, the first communication card of the terminal device is in a communication state, and the first uplink capability corresponds to the first communication card. Then, the terminal device first adjusts the uplink capability corresponding to the first communication card. In this case, the terminal device sends the first message to the first network device, where the first message includes or is used to indicate the second uplink capability, and the second uplink capability is less than the first uplink capability. Then, the first network device adjusts the uplink capability corresponding to the first communication card, to be specific, the first network device adjusts the first uplink capability to the second uplink capability. Optionally, the first network device sends a response message to the terminal device, where the response message is used to indicate that the first uplink capability corresponding to the first communication card is adjusted to the lower second uplink capability. Therefore, the terminal device communicates with the first network device by using the second uplink capability. In this case, the first communication card of the terminal device is still in a communication state, and the second uplink capability corresponds to the first communication card. Then, the third uplink capability is configured for the second communication card in the terminal device. For example, the third uplink capability is obtained by subtracting the second uplink capability from the first uplink capability. Therefore, the terminal device may communicate with the second network device by using the third uplink capability. In this case, the second communication card of the terminal device is in a communication state, and the third uplink capability corresponds to the second communication card. In the foregoing process, both the first communication card and the second communication card in the terminal device are in a communication state, to implement dual SIM dual activation.

Scenario 2: Initially, the second communication card of the terminal device is in a communication state, and the first communication card of the terminal device is in a wait state. For example, the first communication card is a secondary card, and the second communication card is a primary card. Then, the third uplink capability is configured for communication between the terminal device and the second network device, and an uplink capability needs to be reconfigured for communication between the terminal device and the first network device. In this case, step S101 and step S102 are first performed, where the second uplink capability is greater than the first uplink capability. Then, the terminal device communicates with the first network device by using the second uplink capability, and the terminal device communicates with the second network device by using the third uplink capability. In the foregoing process, the first communication card corresponds to the first uplink capability and the second uplink capability, and the second communication card corresponds to the third uplink capability. In the foregoing process, both the first communication card and the second communication card in the terminal device are in a communication state, to implement dual SIM dual activation.

Scenario 3: Both the first communication card and the second communication card of the terminal device are in a communication state. Then, after the first communication card completes a communication process, an uplink capability needs to be reconfigured for each of the first communication card and the second communication card, and an uplink capability previously configured for the first communication card is returned to the second communication card. In this way, the first communication card and the second communication card are restored to a previous communication state, so that the first communication card of the terminal device is in a wait state, and the second communication card of the terminal device is in a communication state. For example, the first communication card is a secondary card, and the second communication card is a primary card.

In the third scenario, first, in this case, the terminal device communicates with the first network device by using the first uplink capability, to be specific, the first communication card of the terminal device is in a communication state, and the first uplink capability corresponds to the first communication card. Then, the terminal device first adjusts the uplink capability corresponding to the first communication card. In this case, the terminal device sends the first message to the first network device, where the first message includes or is used to indicate the second uplink capability, and the second uplink capability is less than the first uplink capability. Then, the first network device adjusts the uplink capability corresponding to the first communication card, to be specific, the first network device adjusts the first uplink capability to the second uplink capability. Optionally, the first network device sends a response message to the terminal device, where the response message is used to indicate that the first uplink capability corresponding to the first communication card is adjusted to the lower second uplink capability. Therefore, the terminal device communicates with the first network device by using the second uplink capability. In this case, the first communication card of the terminal device is still in a communication state, and the second uplink capability corresponds to the first communication card. Alternatively, the terminal device does not communicate with the first network device. In this case, the first communication card of the terminal device is a wait state. Then, the third uplink capability is configured for the second communication card in the terminal device. For example, the third uplink capability is obtained by subtracting the second uplink capability from the first uplink capability and then adding an uplink capability previously used by the second communication card. Therefore, the terminal device may communicate with the second network device by using the third uplink capability. In this case, the second communication card of the terminal device is in a communication state, and the third uplink capability corresponds to the second communication card. In the foregoing process, the uplink capability previously configured for the first communication card is returned to the second communication card. In this way, the first communication card and the second communication card are restored to a previous communication state. For example, the first communication card of the terminal device is in a wait state, and the second communication card of the terminal device is in a communication state.

Scenario 4: Initially, both the first communication card and the second communication card of the terminal device are in a communication state. For example, the first communication card is a primary card, and the second communication card is a secondary card. Then, the third uplink capability is configured for the communication between the terminal device and the second network device, and an uplink capability needs to be reconfigured for the communication between the terminal device and the first network device. In this case, step S101 and step S102 are first performed, where the second uplink capability is greater than the first uplink capability. Then, the terminal device communicates with the first network device by using the second uplink capability, and the terminal device communicates with the second network device by using the third uplink capability. In the foregoing process, the first communication card corresponds to the first uplink capability and the second uplink capability, and the second communication card corresponds to the third uplink capability. In the foregoing process, an uplink capability previously configured for the second communication card is returned to the first communication card. In this way, the first communication card and the second communication card are restored to a previous communication state. For example, the second communication card of the terminal device is in a wait state, and the first communication card of the terminal device is in a communication state.

For example, a communication card 1 and a communication card 2 are disposed in the terminal device, the communication card 1 is a primary card, the communication card 2 is a secondary card, the communication card 1 is in a communication state, and the communication card 2 is in a wait state. The communication card 1 corresponds to a network device 1, and the communication card 2 corresponds to a network device 2. To be specific, if the communication card 1 performs communication, the terminal device communicates with the network device 1, and if the communication card 2 performs communication, the terminal device communicates with the network device 2. The network device 2 sends a trigger message to the terminal device, where the trigger message is used to indicate that the communication card 2 needs to perform communication.

In this case, the terminal device communicates with the network device 1 by using an uplink capability of 2 T, to be specific, the communication card 1 of the terminal device is in a communication state, and the uplink capability of 2 T corresponds to the communication card 1.

Then, the terminal device sends a message 1 to the network device 1, where the message 1 is used to indicate an uplink capability of 1 T. Then, the network device 1 adjusts the uplink capability corresponding to the communication card 1, to be specific, the network device 1 adjusts the uplink capability of 2 T to the uplink capability of 1 T. The network device sends a response message to the terminal device. The terminal device communicates with the network device 1 by using the uplink capability of 1 T. In this case, the communication card 1 of the terminal device is still in a communication state.

Then, an uplink capability of 1 T is configured for the communication card 1 in the terminal device, that is, an uplink capability of 1 T is subtracted from the uplink capability of 2 T. Therefore, the terminal device may communicate with the network device 2 by using the uplink capability of 1 T. In this case, the communication card 2 of the terminal device is in a communication state. In the foregoing process, both the communication card 1 and the second communication card 2 in the terminal device are in a communication state, to implement dual SIM dual activation.

After the communication card 2 completes communication, the terminal device automatically detects that the uplink capability can be released. Then, the terminal device sends a message 2 to the network device 2, where the message 2 is used to indicate an uplink capability of 0 T. Then, the network device 2 adjusts an uplink capability corresponding to the communication card 2, to be specific, the network device 2 adjusts the uplink capability of 1 T to the uplink capability of 0 T. The network device sends a response message to the terminal device. The terminal device communicates with the network device 2 by using the uplink capability of 0 T. In this case, the communication card 2 of the terminal device is not in a communication state, and the communication card 1 is in a wait state.

Then, the uplink capability of 2 T is configured for the communication card 1 in the terminal device, that is, an uplink capability of 1 T plus an uplink capability of 1 T. Therefore, the terminal device may communicate with the network device 1 by using the uplink capability of 2 T. In this case, the communication card 1 of the terminal device is in a communication state. Therefore, both the communication card 1 and the second communication card 2 in the terminal device are restored to previous states, that is, the communication card 1 is in a communication state, and the communication card 2 is in a wait state.

Figure 4:
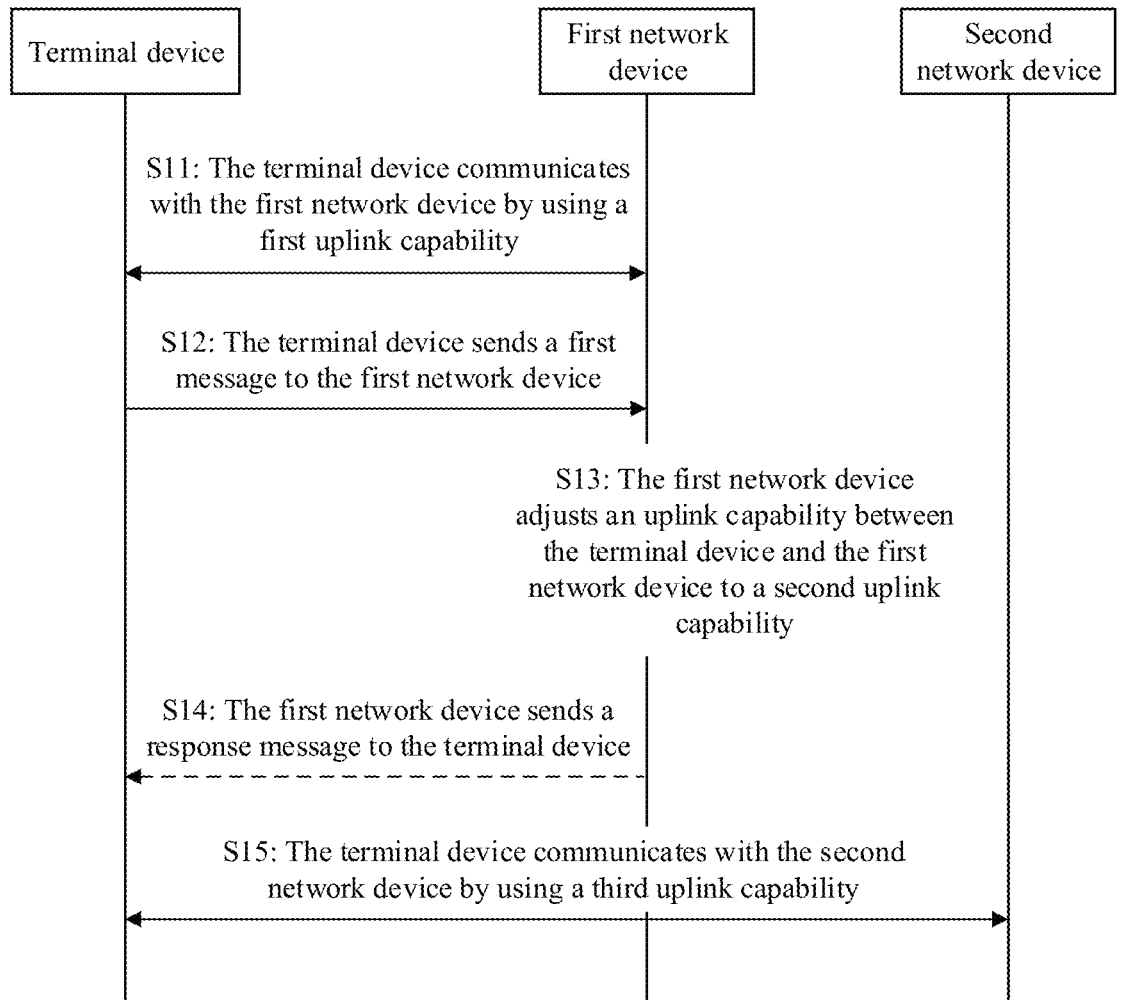
FIG. 4 is a signaling diagram 1 of a dual communication card-based communication method according to an embodiment of this application.

FIG. 4 is a signaling diagram 1 of a dual communication card-based communication method according to an embodiment of this application. As shown in FIG. 4, the method includes the following steps.

S11: A terminal device communicates with a first network device by using a first uplink capability.

S12: The terminal device sends a first message to the first network device, where the first message is used to indicate a second uplink capability used by the terminal device to communicate with the first network device, and the second uplink capability is different from the first uplink capability.

S13: The first network device adjusts an uplink capability between the terminal device and the first network device to the second uplink capability.

Optionally, S14: The first network device sends a response message to the terminal device, where the response message is used to indicate that the uplink capability between the terminal device and the first network device is the second uplink capability.

S15: The terminal device communicates with a second network device by using a third uplink capability, where the third uplink capability is different from the first uplink capability.

For example, for the steps in this embodiment of this application, refer to the steps shown in FIG. 3. Details are not described again. In this embodiment, the first network device and the second network device are different network devices.

Figure 5:
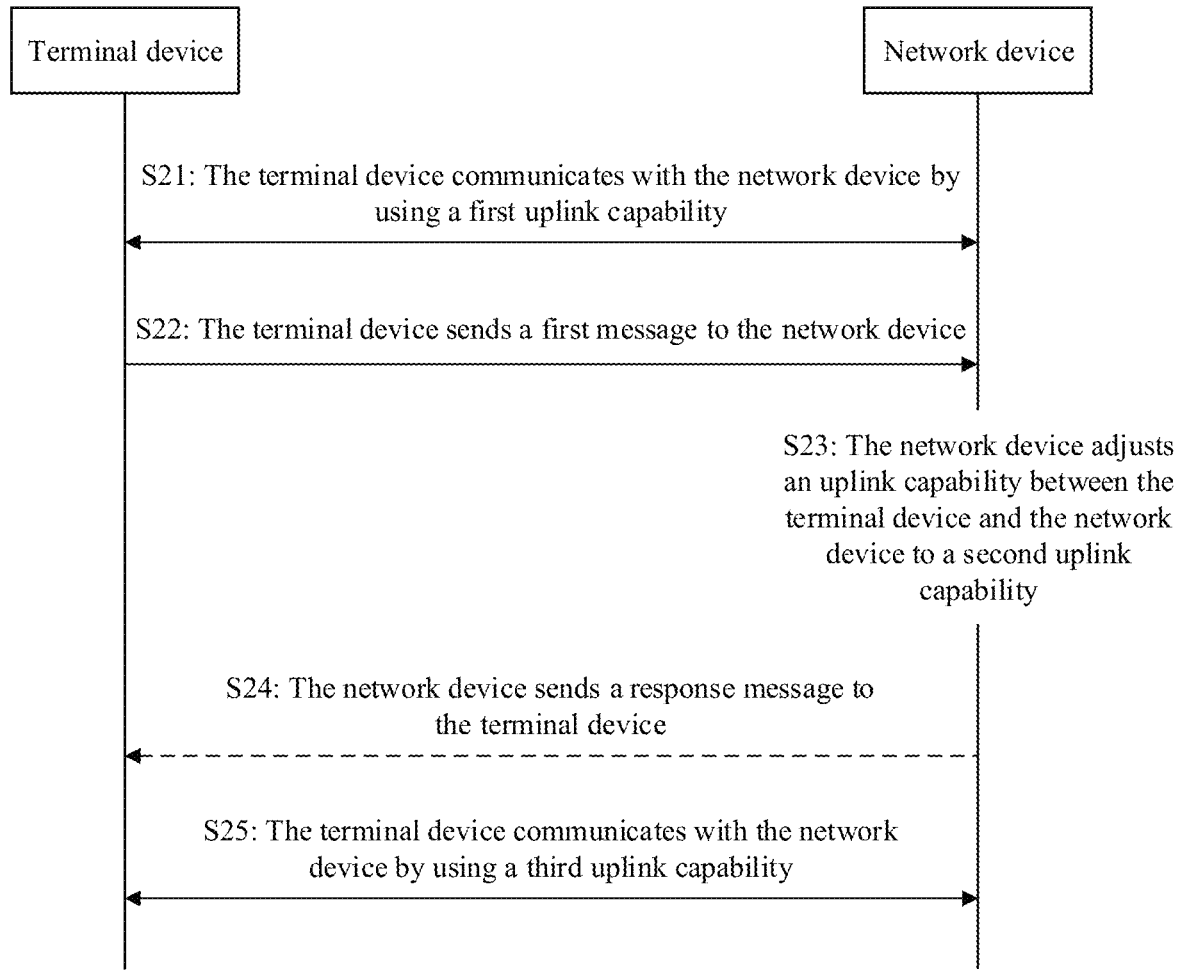
FIG. 5 is a signaling diagram 2 of a dual communication card-based communication method according to an embodiment of this application.

FIG. 5 is a signaling diagram 2 of a dual communication card-based communication method according to an embodiment of this application. As shown in FIG. 5, the method includes the following steps.

S21: A terminal device communicates with a network device by using a first uplink capability.

S22: The terminal device sends a first message to the network device, where the first message is used to indicate a second uplink capability used by the terminal device to communicate with the network device, and the second uplink capability is different from the first uplink capability.

S23: The network device adjusts an uplink capability between the terminal device and the network device to the second uplink capability.

Optionally, S24: The network device sends a response message to the terminal device, where the response message is used to indicate that the uplink capability between the terminal device and the network device is the second uplink capability.

S25: The terminal device communicates with the network device by using a third uplink capability, where the third uplink capability is different from the first uplink capability.

For example, for the steps in this embodiment of this application, refer to the steps shown in FIG. 3. Details are not described again. In this embodiment, the network devices are a same network device.

In this embodiment, the terminal device communicates with a first network device by using the first uplink capability, where a first communication card and a second communication card are disposed in the terminal device; the terminal device sends a first message to the first network device, where the first message is used to indicate the second uplink capability used by the terminal device to communicate with the first network device, and the second uplink capability is different from the first uplink capability; and the terminal device communicates with a second network device by using the third uplink capability, where the third uplink capability is different from the first uplink capability. Therefore, when the first communication card of the terminal device is in a communication state and the second communication card of the terminal device is in a wait state, the terminal device interacts with the network devices, to adjust an uplink capability corresponding to the first communication card to the second uplink capability, and an uplink capability is configured for the second communication card, so that both the first communication card and the second communication card in the terminal device are in a communication state, to implement dual SIM dual activation. Therefore, a dual SIM and dual active function of the terminal device is implemented, and a redundant radio frequency link does not need to be configured for the terminal device, so that costs of the terminal device are reduced. In addition, when both the first communication card and the second communication card of the terminal device are in a communication state, the uplink capability corresponding to the first communication card is adjusted to the second uplink capability, and an uplink capability previously configured for the first communication card is returned to the second communication card. In this way, the first communication card and the second communication card are restored to a previous communication state, so that the first communication card of the terminal device is in a wait state, and the second communication card of the terminal device is in a communication state.

Figure 6:
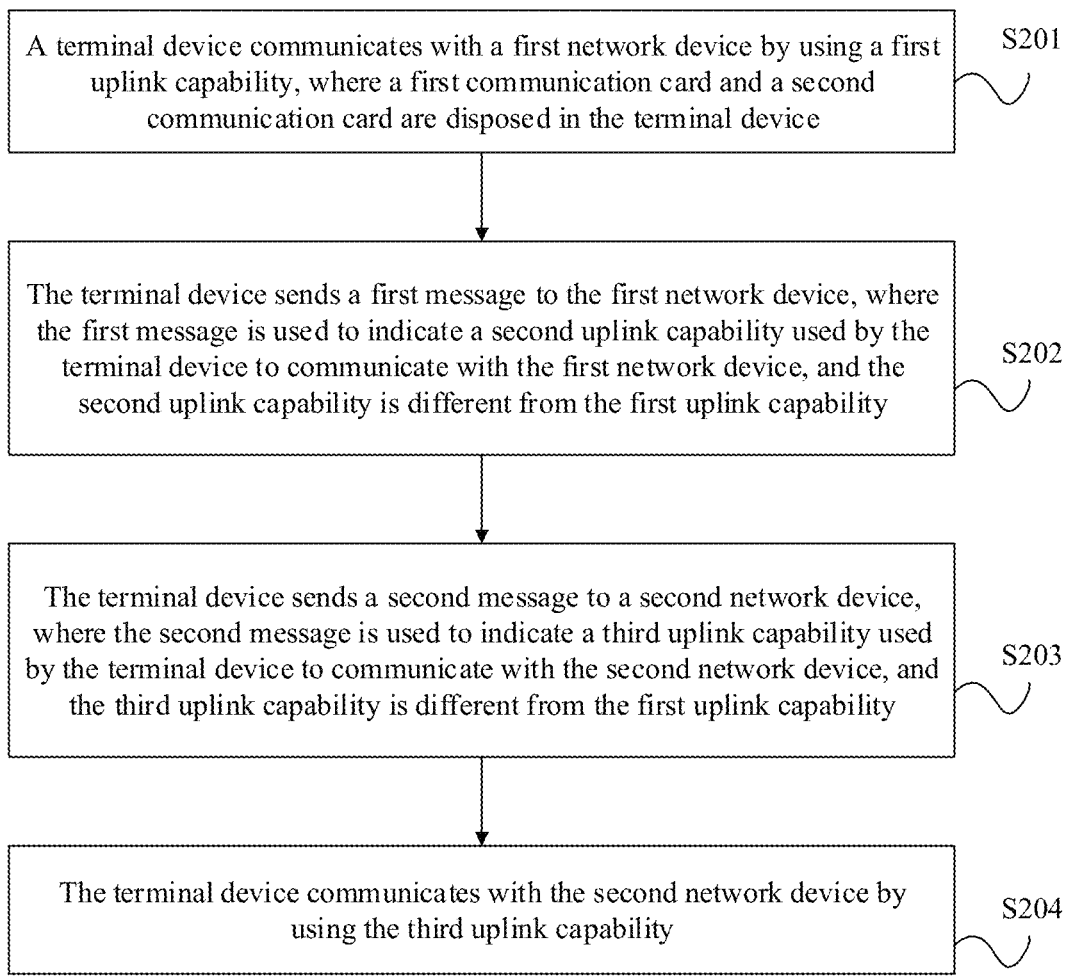
FIG. 6 is a schematic flowchart of another dual communication card-based communication method according to an embodiment of this application.

FIG. 6 is a schematic flowchart of another dual communication card-based communication method according to an embodiment of this application. As shown in FIG. 6, the method includes the following steps.

S201: A terminal device communicates with a first network device by using a first uplink capability. A first communication card and a second communication card are disposed in the terminal device.

For example, for this step, refer to step S101 shown in FIG. 3. Details are not described again.

S202: The terminal device sends a first message to the first network device, where the first message is used to indicate a second uplink capability used by the terminal device to communicate with the first network device, and the second uplink capability is different from the first uplink capability.

For example, for this step, refer to step S102 shown in FIG. 3. Details are not described again.

S203: The terminal device sends a second message to a second network device, where the second message is used to indicate a third uplink capability used by the terminal device to communicate with the second network device, and the third uplink capability is different from the first uplink capability.

Optionally, the first uplink capability is N uplink radio frequency link capabilities, the second uplink capability is M uplink radio frequency link capabilities, and the third uplink capability is N-M-P uplink radio frequency link capabilities, where N is a positive integer greater than or equal to 2, M is a positive integer greater than or equal to 1, M is less than N, and P is an integer greater than or equal to 0 and less than N-M.

After the terminal device sends the first message to the first network device, the first network device adjusts an uplink capability used by the terminal device to communicate with the first network device from the first uplink capability to the second uplink capability. Optionally, the first network device sends a first response message to the terminal device, where the first response message is used to indicate that the uplink capability used by the terminal device to communicate with the first network device is the second uplink capability.

Then, in this step S203, the terminal device sends the second message to the second network device, where the second message may be any one or more of the following: RRC signaling, MAC-CE signaling, or DCI signaling. The first message includes the third uplink capability, or the second message indicates the third uplink capability. The third uplink capability is an uplink capability used by the terminal device to communicate with the second network device.

In addition, a value of the third uplink capability is different from a value of the first uplink capability. Refer to the description in step S103 shown in FIG. 3. Details are not described again.

Then, the second network device adjusts the uplink capability used by the terminal device to communicate with the second network device to the third uplink capability. Optionally, the second network device sends a second response message to the terminal device, where the second response message is used to indicate that the uplink capability used by the terminal device to communicate with the second network device is the third uplink capability.

S204: The terminal device communicates with the second network device by using the third uplink capability.

For example, for this step, refer to step S103 shown in FIG. 3. Details are not described again.

Scenarios related to the foregoing steps include the following scenarios:

Scenario 1: The first communication card of the terminal device is in a communication state, and the second communication card of the terminal device is in a wait state. For example, the first communication card is a primary card, and the second communication card is a secondary card. Then, the terminal device receives a trigger message sent by the second network device, where the trigger message is used to indicate that the second communication card needs to perform communication. In this case, an uplink capability needs to be configured for the second communication card, so that both the first communication card and the second communication card in the terminal device are in a communication state, to implement dual SIM dual activation. In this case, step 201 to step 204 are performed, where the second uplink capability is less than the first uplink capability. In the foregoing process, when the uplink capability used for communication between the terminal device and the first network device is the first uplink capability, the first uplink capability is N uplink radio frequency link capabilities, and a quantity of uplink radio frequency links of the first communication card in the terminal device is N. Then, the first network device adjusts the uplink capability used for communication between the terminal device and the first network device to the second uplink capability, and the second uplink capability is M uplink radio frequency link capabilities. In this case, the terminal device needs to adjust the quantity of the uplink radio frequency links of the first communication card to M. Then, the second network device adjusts the uplink capability used for communication between the terminal device and the second network device to the third uplink capability, and the third uplink capability is N-M-P uplink radio frequency link capabilities. In this case, the terminal device needs to adjust a quantity of uplink radio frequency links of the second communication card to N-M-P, where M is less than N. When P=0, the uplink capability used for communication between the terminal device and the first network device is reduced by N-M uplink radio frequency link capabilities, the second network device configures N-M uplink radio frequency link capabilities for an uplink capability corresponding to the second communication card, and then, the third uplink capability used for communication between the terminal device and the second network device is N-M uplink radio frequency link capabilities. When P is greater than 0 and less than N-M, the uplink capability used for communication between the terminal device and the first network device is reduced by N-M uplink radio frequency link capabilities, the second network device configures N-M-P uplink radio frequency link capabilities for the uplink capability corresponding to the second communication card. To be specific, the second network device does not configure all the N-M uplink radio frequency link capabilities for the uplink capability corresponding to the second communication card, and then, the third uplink capability used for communication between the terminal device and the second network device is N-M-P uplink radio frequency link capabilities. In the foregoing process, both the first communication card and the second communication card in the terminal device are in a communication state, to implement dual SIM dual activation.

Scenario 2: Both the first communication card and the second communication card of the terminal device are in a communication state. Then, after the first communication card completes a communication process, an uplink capability needs to be reconfigured for each of the first communication card and the second communication card, and an uplink capability previously configured for the first communication card is returned to the second communication card. In this way, the first communication card and the second communication card are restored to a previous communication state, so that the first communication card of the terminal device is in a wait state, and the second communication card of the terminal device is in a communication state. For example, the first communication card is a secondary card, and the second communication card is a primary card. In the foregoing process, refer to the description of the uplink radio frequency link capabilities in the scenario 1. Details are not described again. In the foregoing process, the uplink capability previously configured for the first communication card is returned to the second communication card. In this way, the first communication card and the second communication card are restored to a previous communication state. For example, the first communication card of the terminal device is in a wait state, and the second communication card of the terminal device is in a communication state.

Figure 7:
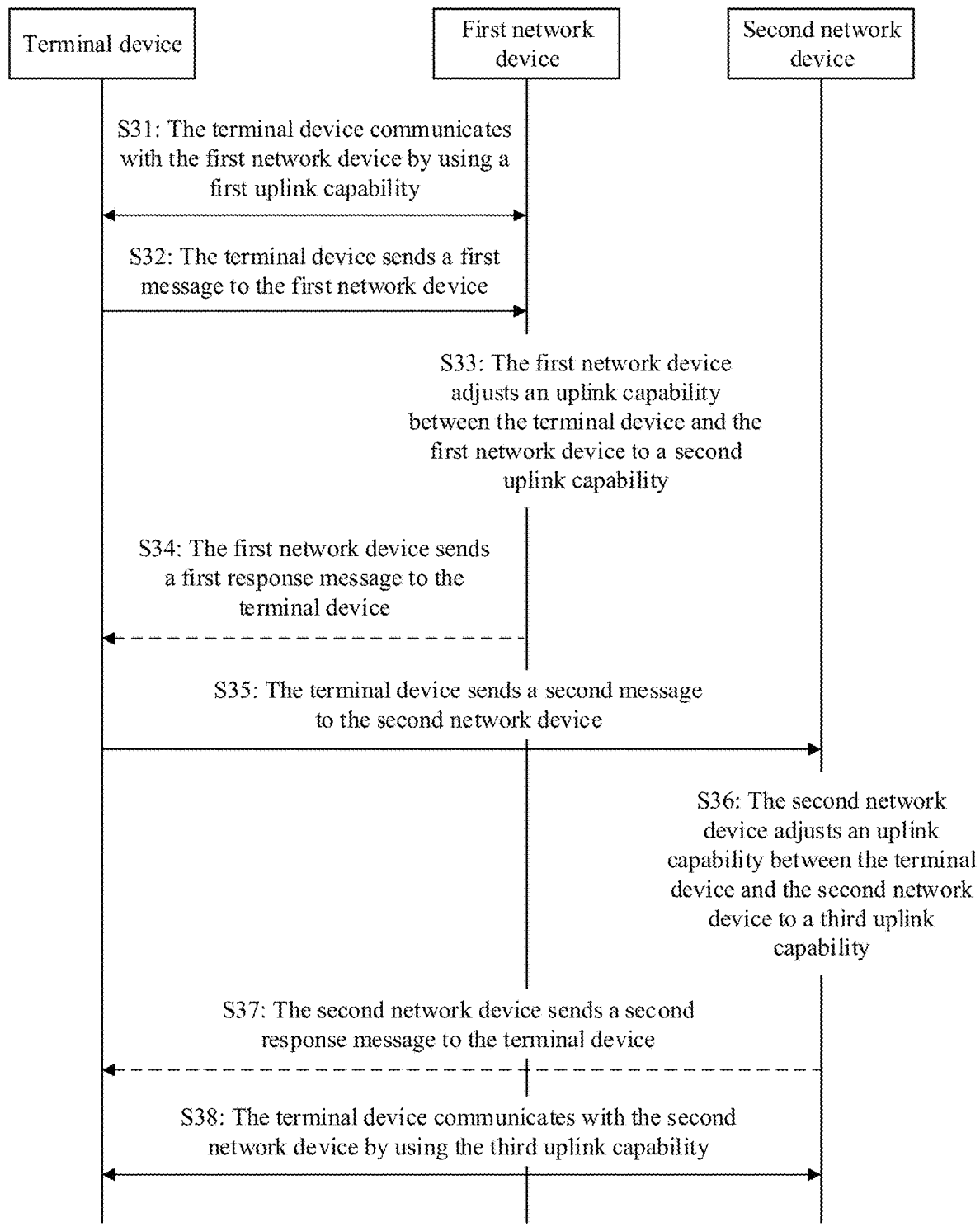
FIG. 7 is a signaling diagram 1 of another dual communication card-based communication method according to an embodiment of this application.

FIG. 7 is a signaling diagram 1 of another dual communication card-based communication method according to an embodiment of this application. As shown in FIG. 7, the method includes the following steps.

S31: A terminal device communicates with a first network device by using a first uplink capability.

S32: The terminal device sends a first message to the first network device, where the first message is used to indicate a second uplink capability used by the terminal device to communicate with the first network device, and the second uplink capability is different from the first uplink capability.

S33: The first network device adjusts an uplink capability between the terminal device and the first network device to the second uplink capability.

Optionally, S34: The first network device sends a first response message to the terminal device, where the first response message is used to indicate that the uplink capability between the terminal device and the first network device is the second uplink capability.

S35: The terminal device sends a second message to a second network device, where the second message is used to indicate a third uplink capability used by the terminal device to communicate with the second network device, and the third uplink capability is different from the first uplink capability.

S36: The second network device adjusts an uplink capability between the terminal device and the second network device to the third uplink capability.

Optionally, S37: The second network device sends a second response message to the terminal device, where the second response message is used to indicate that the uplink capability between the terminal device and the second network device is the third uplink capability.

S38: The terminal device communicates with the second network device by using the third uplink capability, where the third uplink capability is different from the first uplink capability.

For example, for the steps in this embodiment of this application, refer to the steps shown in FIG. 6. Details are not described again. In this embodiment, the first network device and the second network device are different network devices.

Figure 8:
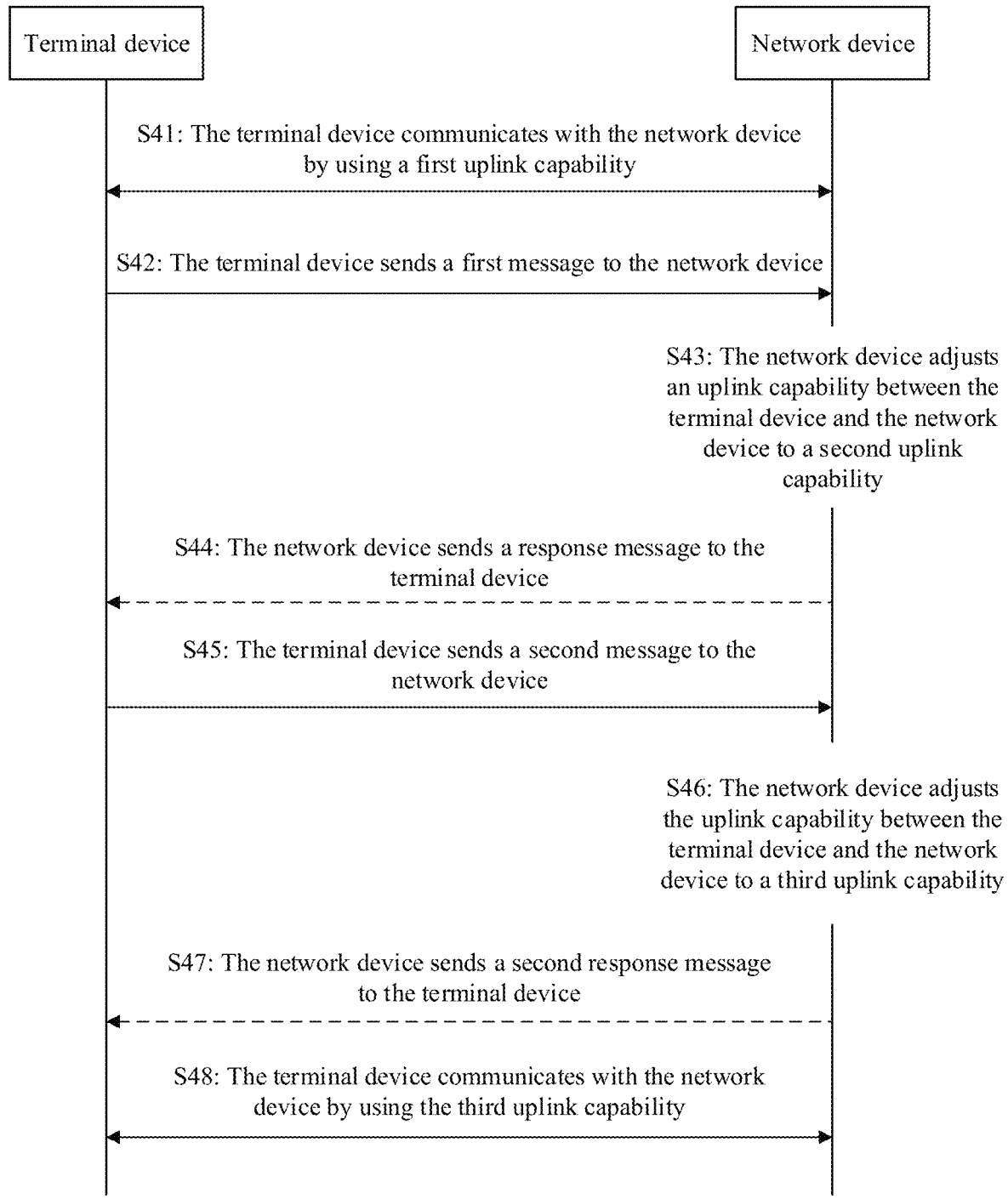
FIG. 8 is a signaling diagram 2 of another dual communication card-based communication method according to an embodiment of this application.

FIG. 8 is a signaling diagram 2 of another dual communication card-based communication method according to an embodiment of this application. As shown in FIG. 8, the method includes the following steps.

S41: A terminal device communicates with a network device by using a first uplink capability.

S42: The terminal device sends a first message to the network device, where the first message is used to indicate a second uplink capability used by the terminal device to communicate with the network device, and the second uplink capability is different from the first uplink capability.

S43: The network device adjusts an uplink capability between the terminal device and the network device to the second uplink capability.

Optionally, S44: The network device sends a response message to the terminal device, where the response message is used to indicate that the uplink capability between the terminal device and the network device is the second uplink capability.

S45: The terminal device sends a second message to the network device, where the second message is used to indicate a third uplink capability used by the terminal device to communicate with the network device, and the third uplink capability is different from the first uplink capability.

S46: The network device adjusts the uplink capability between the terminal device and the network device to the third uplink capability.

Optionally, S47: The network device sends a second response message to the terminal device, where the second response message is used to indicate that the uplink capability between the terminal device and the network device is the third uplink capability.

S48: The terminal device communicates with the network device by using the third uplink capability, where the third uplink capability is different from the first uplink capability.

For example, for the steps in this embodiment of this application, refer to the steps shown in FIG. 7. Details are not described again. In this embodiment, the network devices are a same network device.

In this embodiment, based on the foregoing embodiments, the terminal device interacts with the first network device and the second network device, to adjust the uplink capability used by the terminal device to communicate with the first network device and adjust the uplink capability used by the terminal device to communicate with the second network device. Further, an uplink radio frequency link capability between the terminal device and the first network device and an uplink radio frequency link capability between the terminal device and the second network device are adjusted. Therefore, a dual SIM and dual active function of the terminal device is implemented, and a redundant radio frequency link does not need to be configured for the terminal device. This reduces costs of the terminal device. In addition, when both a first communication card and a second communication card of the terminal device are in a communication state, an uplink capability corresponding to the first communication card is adjusted to the second uplink capability, and an uplink capability previously configured for the first communication card is returned to the second communication card. In this way, the first communication card and the second communication card are restored to a previous communication state.

Figure 9:
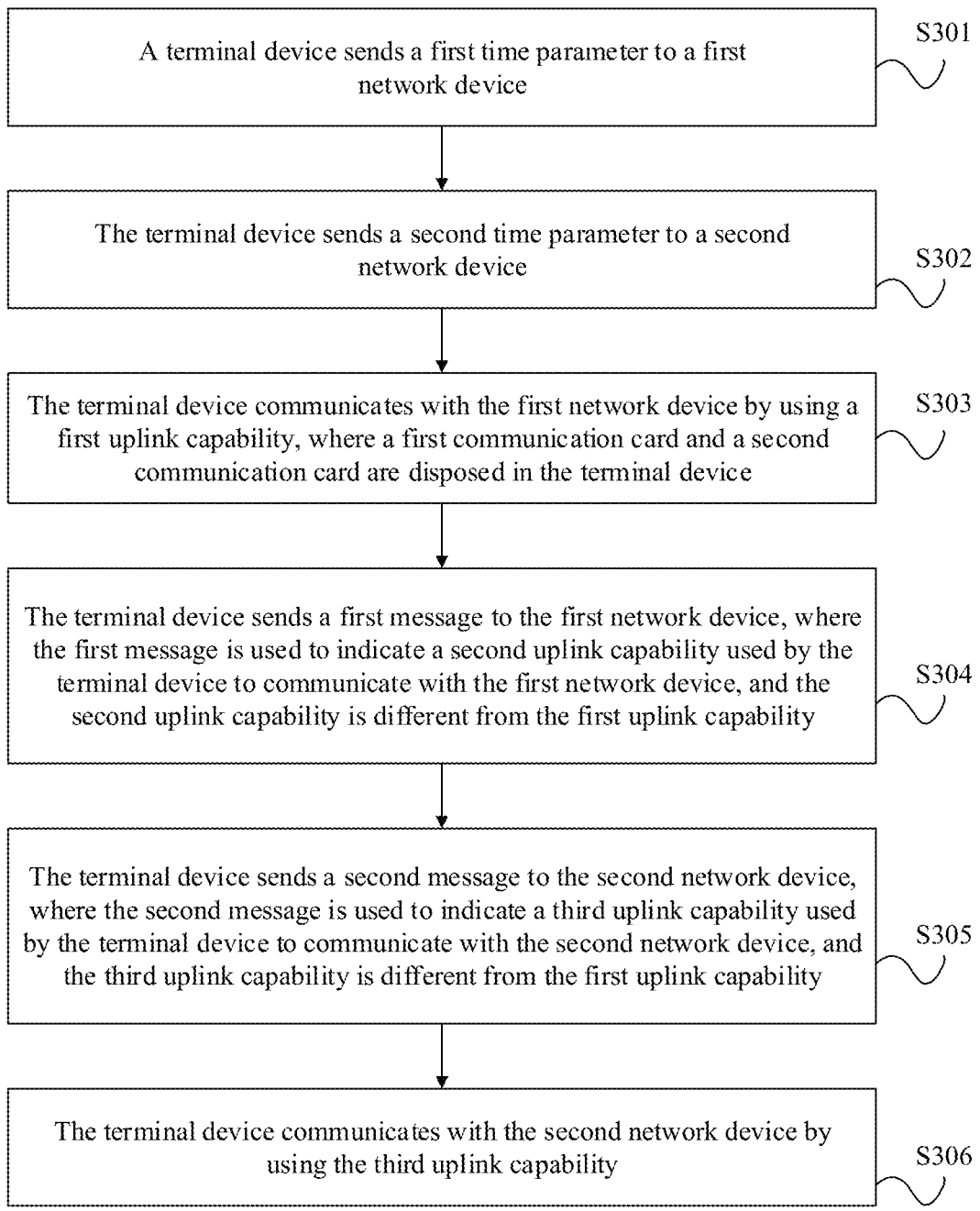
FIG. 9 is a schematic flowchart of still another dual communication card-based communication method according to an embodiment of this application.

FIG. 9 is a schematic flowchart of still another dual communication card-based communication method according to an embodiment of this application. As shown in FIG. 9, the method includes the following steps.

S301: A terminal device sends a first time parameter to a first network device, where the first time parameter is a time parameter of a second uplink capability.

S302: The terminal device sends a second time parameter to a second network device, where the second time parameter is a time parameter of a third uplink capability.

For example, steps S301 and S302 may be performed before or after step S303, and an execution order between step S301 and step S302 is not limited.

For example, the terminal device sends the first time parameter to the first network device, and the first time parameter is a time parameter used when the second uplink capability is used between the terminal device and the first network device. In other words, the first time parameter indicates a time point at which the first network device adjusts a first uplink capability to the second uplink capability.

The terminal device sends the second time parameter to the second network device, and the second time parameter is a time parameter used when the third uplink capability is used between the terminal device and the second network device. In other words, the second time parameter indicates a time point at which the second network device adjusts an uplink capability between the terminal device and the second network device to the second uplink capability.

The first time parameter may be a time domain working parameter, for example, a connected discontinuous reception (connected discontinuous reception, C-DRX) parameter.

For example, the terminal device sends the first time parameter to the first network device, and the terminal device sends the second time parameter to the second network device. In this case, in step S304, after the terminal device sends a first message to the first network device, the first network device determines the second uplink capability, and then, the first network device adjusts an uplink capability between the terminal device and the first network device to the second uplink capability at the time point indicated by the first time parameter. Then, the terminal device communicates with the first network device by using the second uplink capability at the time point indicated by the first time parameter. In step S305, after the terminal device sends a second message to the second network device, the second network device determines the third uplink capability, and then, the second network device adjusts an uplink capability between the terminal device and the second network device to the third uplink capability at the time point indicated by the second time parameter. Then, the terminal device communicates with the second network device by using the third uplink capability at the time point indicated by the second time parameter.

S303: The terminal device communicates with the first network device by using the first uplink capability. A first communication card and a second communication card are disposed in the terminal device.

For example, for this step, refer to step S101 shown in FIG. 3. Details are not described again.

S304: The terminal device sends the first message to the first network device, where the first message is used to indicate the second uplink capability used by the terminal device to communicate with the first network device, and the second uplink capability is different from the first uplink capability.

For example, for this step, refer to step S102 shown in FIG. 3. Details are not described again.

S305: The terminal device sends the second message to the second network device, where the second message is used to indicate the third uplink capability used by the terminal device to communicate with the second network device, and the third uplink capability is different from the first uplink capability.

For example, for this step, refer to step S203 shown in FIG. 6. Details are not described again.

S306: The terminal device communicates with the second network device by using the third uplink capability.

For example, for this step, refer to step S103 shown in FIG. 3. Details are not described again.

Figure 10:
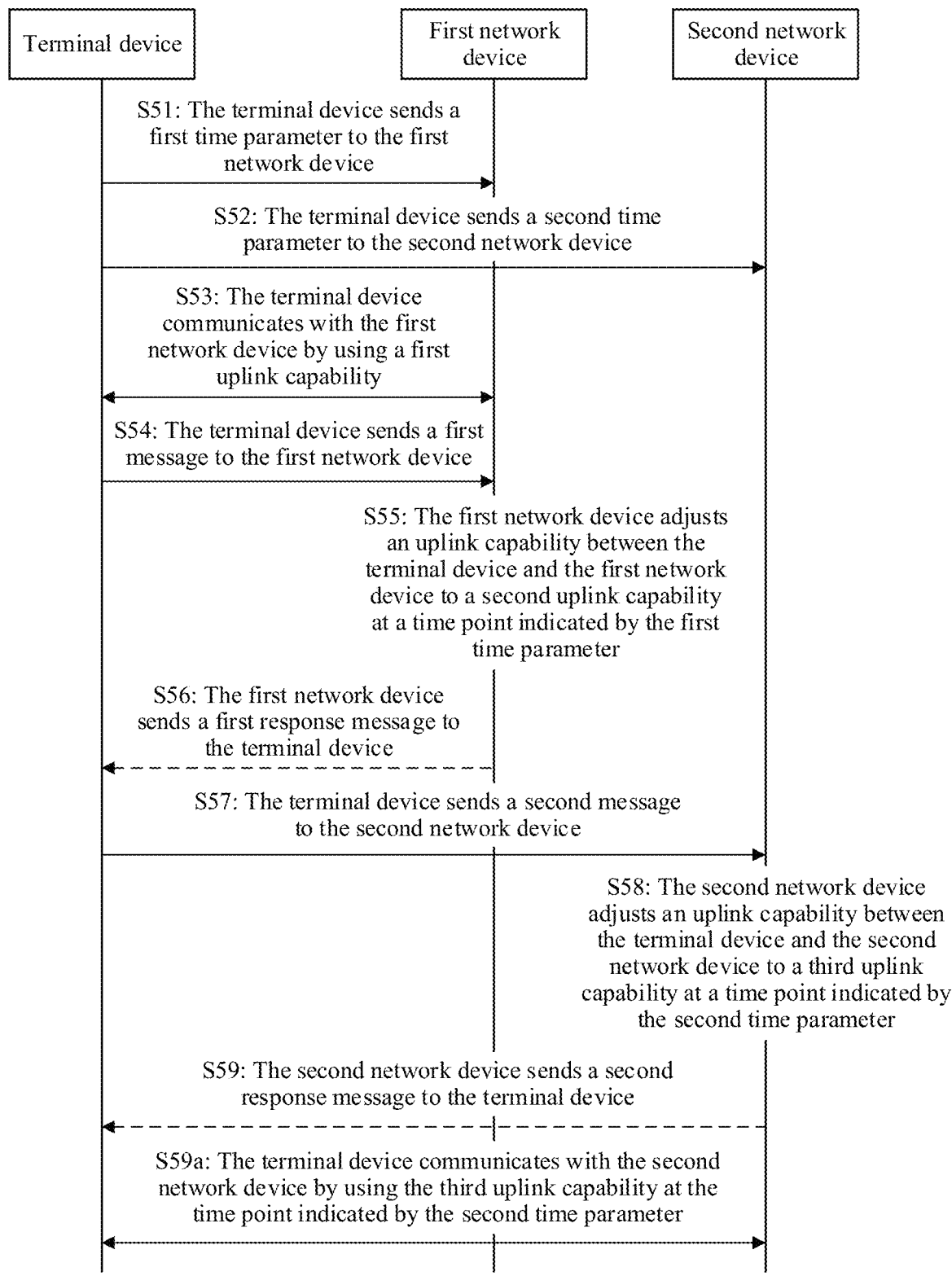
FIG. 10 is a signaling diagram 1 of still another dual communication card-based communication method according to an embodiment of this application.

FIG. 10 is a signaling diagram 1 of still another dual communication card-based communication method according to an embodiment of this application. As shown in FIG. 10, the method includes the following steps.

S51: A terminal device sends a first time parameter to a first network device, where the first time parameter is a time parameter of a second uplink capability.

S52: The terminal device sends a second time parameter to a second network device, where the second time parameter is a time parameter of a third uplink capability.

S53: The terminal device communicates with the first network device by using a first uplink capability.

S54: The terminal device sends a first message to the first network device, where the first message is used to indicate the second uplink capability used by the terminal device to communicate with the first network device, and the second uplink capability is different from the first uplink capability.

S55: The first network device adjusts an uplink capability between the terminal device and the first network device to the second uplink capability at a time point indicated by the first time parameter.

Optionally, S56: The first network device sends a first response message to the terminal device, where the first response message is used to indicate that the uplink capability between the terminal device and the first network device is the second uplink capability.

S57: The terminal device sends a second message to the second network device, where the second message is used to indicate the third uplink capability used by the terminal device to communicate with the second network device, and the third uplink capability is different from the first uplink capability.

S58: The second network device adjusts an uplink capability between the terminal device and the second network device to the third uplink capability at a time point indicated by the second time parameter.

Optionally, S59: The second network device sends a second response message to the terminal device, where the second response message is used to indicate that the uplink capability between the terminal device and the second network device is the third uplink capability.

S59a: The terminal device communicates with the second network device by using the third uplink capability at the time point indicated by the second time parameter, where the third uplink capability is different from the first uplink capability.

For example, for the steps in this embodiment of this application, refer to the steps shown in FIG. 9. Details are not described again. In this embodiment, the first network device and the second network device are different network devices.

Figure 11:
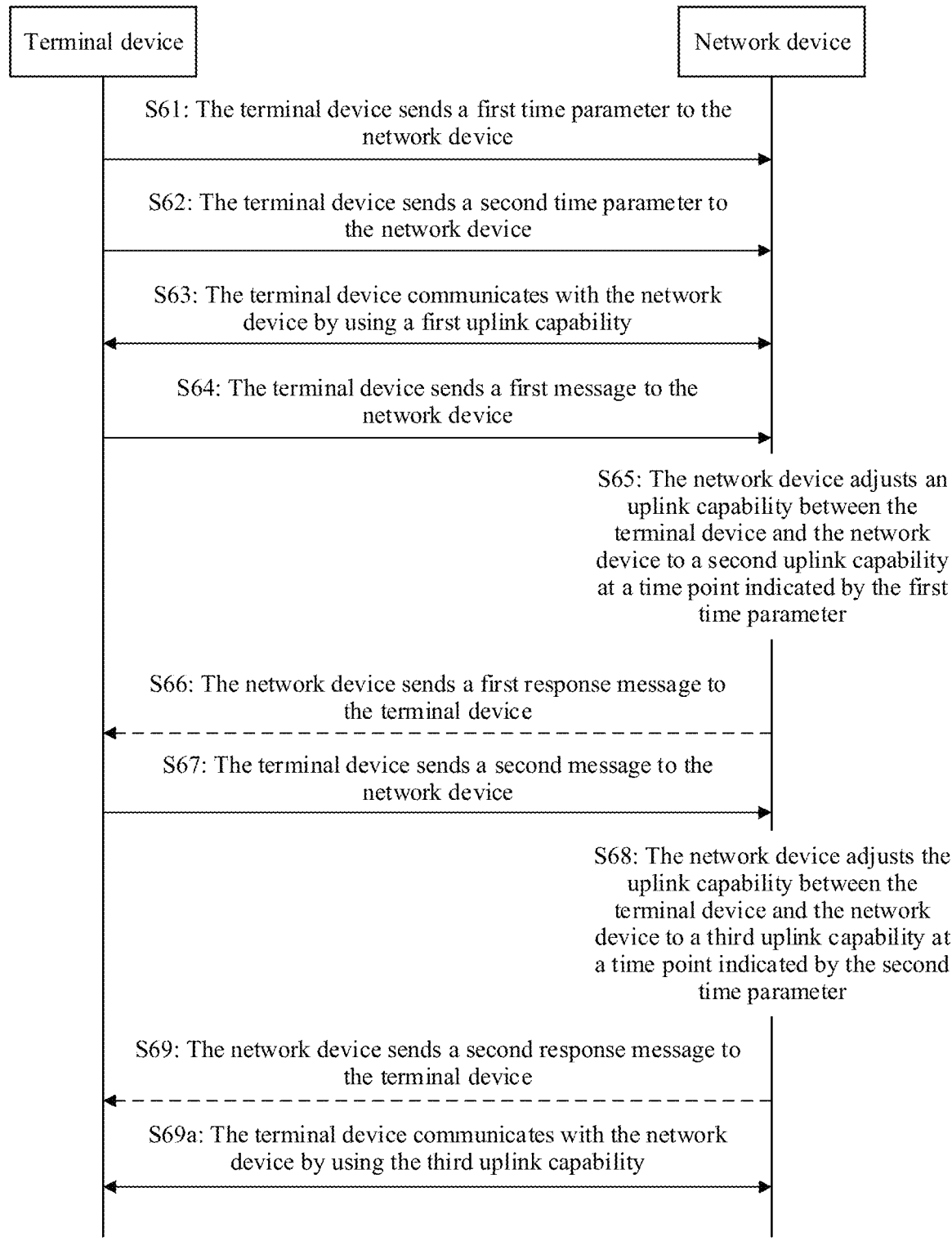
FIG. 11 is a signaling diagram 2 of still another dual communication card-based communication method according to an embodiment of this application.

FIG. 11 is a signaling diagram 2 of still another dual communication card-based communication method according to an embodiment of this application. As shown in FIG. 11, the method includes the following steps.

S61: A terminal device sends a first time parameter to a network device, where the first time parameter is a time parameter of a second uplink capability.

S62: The terminal device sends a second time parameter to the network device, where the second time parameter is a time parameter of a third uplink capability.

S63: The terminal device communicates with the network device by using a first uplink capability.

S64: The terminal device sends a first message to the network device, where the first message is used to indicate the second uplink capability used by the terminal device to communicate with the network device, and the second uplink capability is different from the first uplink capability.

S65: The network device adjusts an uplink capability between the terminal device and the network device to the second uplink capability at a time point indicated by the first time parameter.

Optionally, S66: The network device sends a first response message to the terminal device, where the first response message is used to indicate that the uplink capability between the terminal device and the network device is the second uplink capability.

S67: The terminal device sends a second message to the network device, where the second message is used to indicate the third uplink capability used by the terminal device to communicate with the network device, and the third uplink capability is different from the first uplink capability.

S68: The network device adjusts the uplink capability between the terminal device and the network device to the third uplink capability at a time point indicated by the second time parameter.

Optionally, S69: The network device sends a second response message to the terminal device, where the second response message is used to indicate that the uplink capability between the terminal device and the network device is the third uplink capability.

S69a: The terminal device communicates with the network device by using the third uplink capability at the time point indicated by the second time parameter, where the third uplink capability is different from the first uplink capability.

For example, for the steps in this embodiment of this application, refer to the steps shown in FIG. 9. Details are not described again. In this embodiment, the network devices are a same network device.

In this embodiment, based on the foregoing embodiments, the terminal device sends the first time parameter to a first network device, and the terminal device sends the second time parameter to a second network device. Therefore, the terminal device communicates with the first network device by using the second uplink capability at the time point indicated by the first time parameter; and the terminal device communicates with the second network device by using the third uplink capability at the time point indicated by the second time parameter. An effect of periodically adjusting an uplink capability is implemented.

Figure 12:
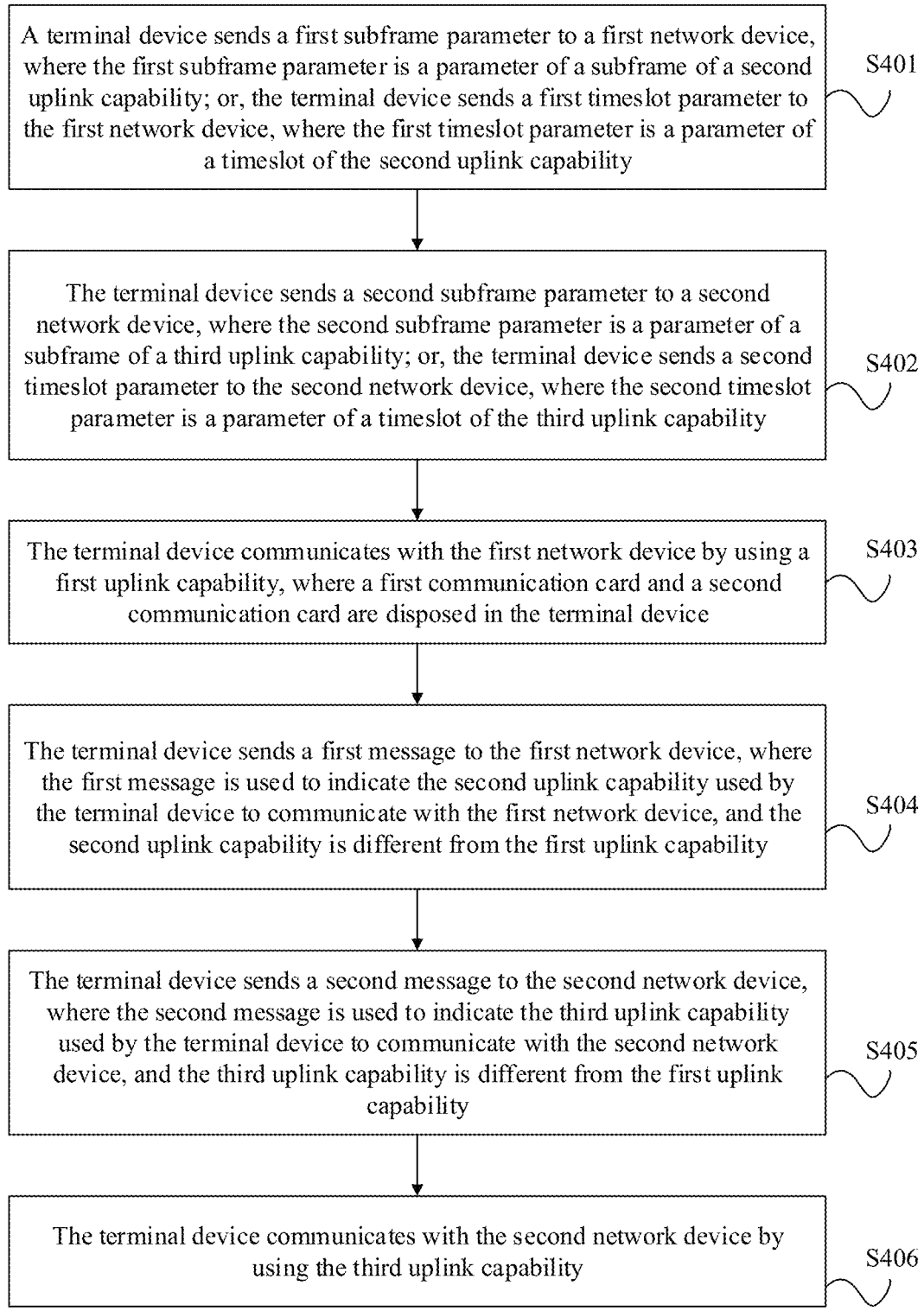
FIG. 12 is a schematic flowchart of yet another dual communication card-based communication method according to an embodiment of this application.

FIG. 12 is a schematic flowchart of yet another dual communication card-based communication method according to an embodiment of this application. As shown in FIG. 12, the method includes the following steps.

S401: A terminal device sends a first subframe parameter to a first network device, where the first subframe parameter is a parameter of a subframe of a second uplink capability; or, the terminal device sends a first timeslot parameter to the first network device, where the first timeslot parameter is a parameter of a timeslot of the second uplink capability.

S402: The terminal device sends a second subframe parameter to a second network device, where the second subframe parameter is a parameter of a subframe of a third uplink capability; or, the terminal device sends a second timeslot parameter to the second network device, where the second timeslot parameter is a parameter of a timeslot of the third uplink capability.

For example, steps S401 and S402 may be performed before or after step S403, and an execution order between step S401 and step S402 is not limited.

For example, the terminal device sends the first subframe parameter to the first network device, and the first subframe parameter indicates a subframe used when the terminal device uses the second uplink capability. Alternatively, the terminal device sends the first timeslot parameter to the first network device, and the first timeslot parameter indicates a timeslot used when the terminal device uses the second uplink capability.

The terminal device sends the second subframe parameter to the second network device, and the second subframe parameter indicates a subframe used when the terminal device uses the third uplink capability. Alternatively, the terminal device sends the second timeslot parameter to the second network device, and the second timeslot parameter indicates a timeslot used when the terminal device uses the third uplink capability.

For example, the terminal device sends the first subframe parameter to the first network device, and the terminal device sends the second subframe parameter to the second network device. Alternatively, the terminal device sends the first timeslot parameter to the first network device, and the terminal device sends the second timeslot parameter to the second network device. Alternatively, the terminal device sends the first subframe parameter to the first network device, and the terminal device sends the second timeslot parameter to the second network device. Alternatively, the terminal device sends the first timeslot parameter to the first network device, and the terminal device sends the second subframe parameter to the second network device.

For example, the terminal device sends the first subframe parameter to the first network device, and the terminal device sends the second subframe parameter to the second network device. In this case, in step S404, after the terminal device sends a first message to the first network device, the first network device determines the second uplink capability, and then, the first network device adjusts an uplink capability between the terminal device and the first network device to the second uplink capability. Then, the terminal device communicates with the first network device by using the second uplink capability in a subframe indicated by the first subframe parameter. In step S405, after the terminal device sends a second message to the second network device, the second network device determines the third uplink capability, and then, the second network device adjusts an uplink capability between the terminal device and the second network device to the third uplink capability. Then, the terminal device communicates with the second network device by using the third uplink capability in a subframe indicated by the second subframe parameter.

For example, the terminal device sends the first timeslot parameter to the first network device, and the terminal device sends the second timeslot parameter to the second network device. In this case, in step S404, after the terminal device sends the first message to the first network device, the first network device determines the second uplink capability, and then, the first network device adjusts the uplink capability between the terminal device and the first network device to the second uplink capability. Then, the terminal device communicates with the first network device by using the second uplink capability in a timeslot indicated by the first timeslot parameter, that is, the terminal device completes a sending and receiving capability in the timeslot indicated by the first timeslot parameter. In step S405, after the terminal device sends the second message to the second network device, the second network device determines the third uplink capability, and then, the second network device adjusts the uplink capability between the terminal device and the second network device to the third uplink capability. Then, the terminal device communicates with the second network device by using the third uplink capability in a timeslot indicated by the first timeslot parameter, that is, the terminal device completes the sending and receiving capability in the timeslot indicated by the second timeslot parameter.

S403: The terminal device communicates with the first network device by using a first uplink capability. A first communication card and a second communication card are disposed in the terminal device.

For example, for this step, refer to step S101 shown in FIG. 3. Details are not described again.

S404: The terminal device sends the first message to the first network device, where the first message is used to indicate the second uplink capability used by the terminal device to communicate with the first network device, and the second uplink capability is different from the first uplink capability.

For example, for this step, refer to step S102 shown in FIG. 3. Details are not described again.

S405: The terminal device sends the second message to the second network device, where the second message is used to indicate the third uplink capability used by the terminal device to communicate with the second network device, and the third uplink capability is different from the first uplink capability.

For example, for this step, refer to step S203 shown in FIG. 6. Details are not described again.

S406: The terminal device communicates with the second network device by using the third uplink capability.

For example, for this step, refer to step S103 shown in FIG. 3. Details are not described again.

Figure 13:
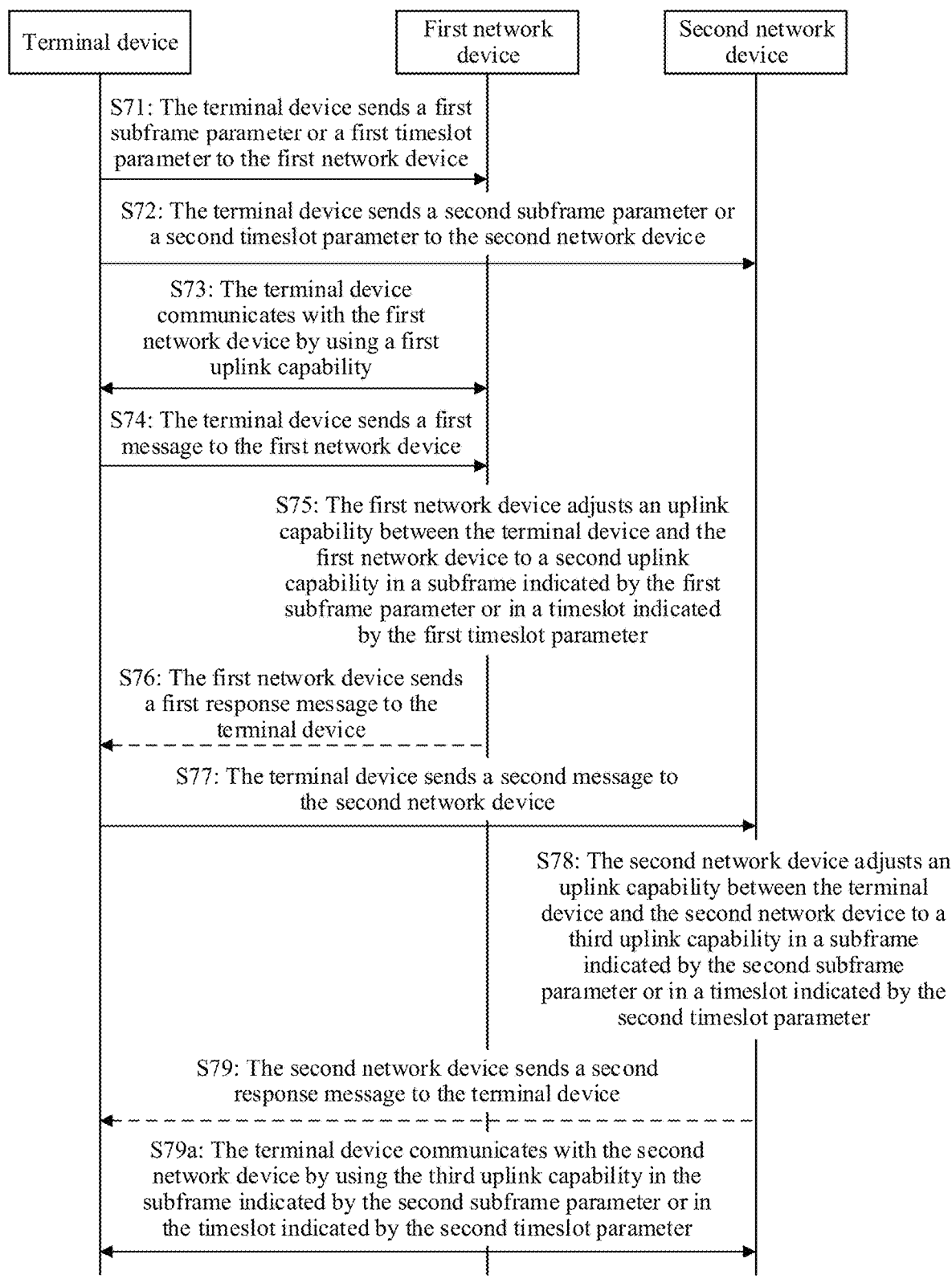
FIG. 13 is a signaling diagram 1 of yet another dual communication card-based communication method according to an embodiment of this application.

FIG. 13 is a signaling diagram 1 of yet another dual communication card-based communication method according to an embodiment of this application. As shown in FIG. 13, the method includes the following steps.

S71: A terminal device sends a first subframe parameter to a first network device, where the first subframe parameter is a parameter of a subframe of a second uplink capability; or, the terminal device sends a first timeslot parameter to the first network device, where the first timeslot parameter is a parameter of a timeslot of the second uplink capability.

S72: The terminal device sends a second subframe parameter to a second network device, where the second subframe parameter is a parameter of a subframe of a third uplink capability; or, the terminal device sends a second timeslot parameter to the second network device, where the second timeslot parameter is a parameter of a timeslot of the third uplink capability.

S73: The terminal device communicates with the first network device by using a first uplink capability.

S74: The terminal device sends a first message to the first network device, where the first message is used to indicate the second uplink capability used by the terminal device to communicate with the first network device, and the second uplink capability is different from the first uplink capability.

S75: The first network device adjusts an uplink capability between the terminal device and the first network device to the second uplink capability in a subframe indicated by the first subframe parameter or in a timeslot indicated by the first timeslot parameter.

Optionally, S76: The first network device sends a first response message to the terminal device, where the first response message is used to indicate that the uplink capability between the terminal device and the first network device is the second uplink capability.

S77: The terminal device sends a second message to the second network device, where the second message is used to indicate the third uplink capability used by the terminal device to communicate with the second network device, and the third uplink capability is different from the first uplink capability.

S78: The second network device adjusts an uplink capability between the terminal device and the second network device to the third uplink capability in a subframe indicated by the second subframe parameter or in a timeslot indicated by the second timeslot parameter.

Optionally, S79: The second network device sends a second response message to the terminal device, where the second response message is used to indicate that the uplink capability between the terminal device and the second network device is the third uplink capability.

S79a: The terminal device communicates with the second network device by using the third uplink capability in the subframe indicated by the second subframe parameter or in the timeslot indicated by the second timeslot parameter, where the third uplink capability is different from the first uplink capability.

For example, for the steps in this embodiment of this application, refer to the steps shown in FIG. 12. Details are not described again. In this embodiment, the first network device and the second network device are different network devices.

Figure 14:
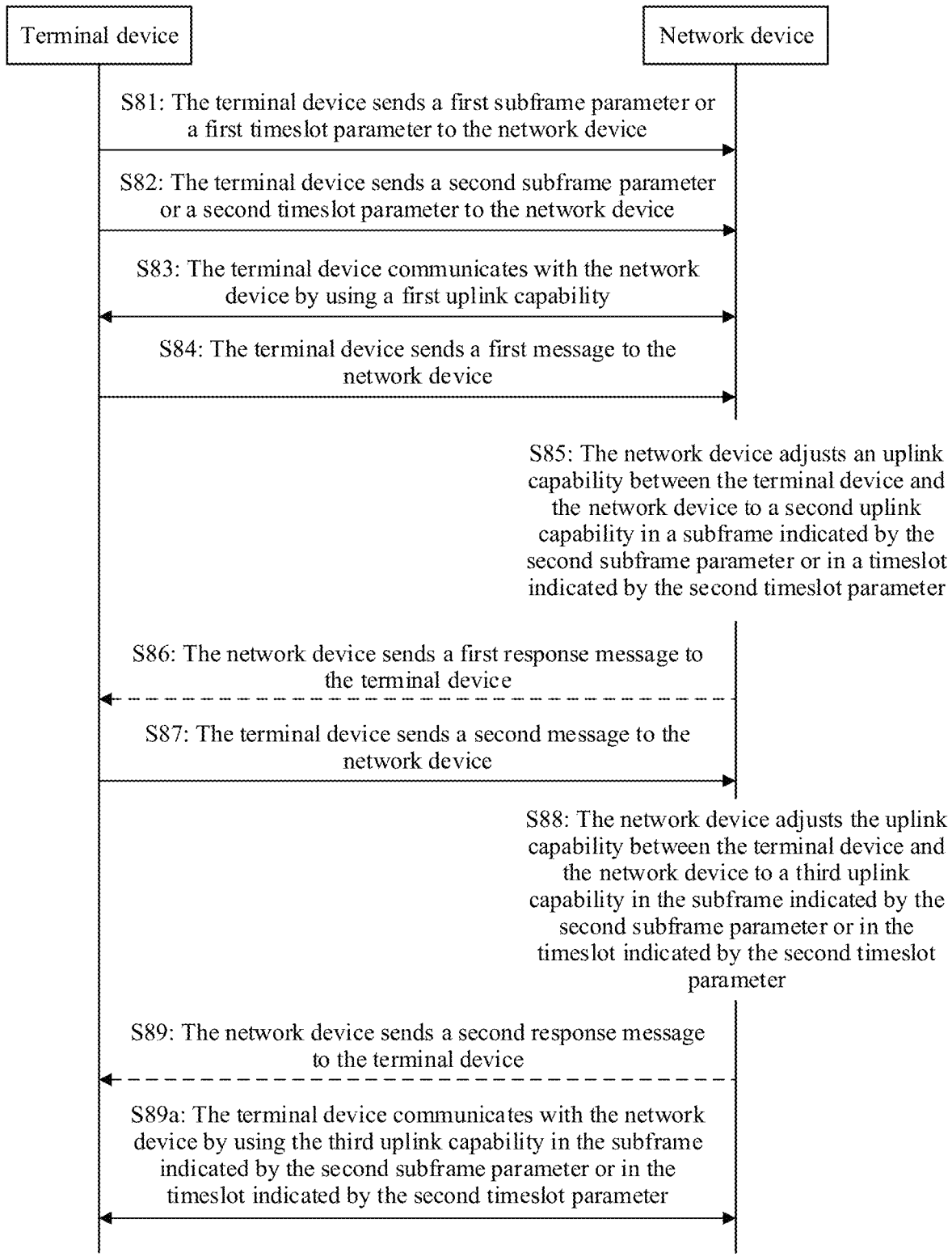
FIG. 14 is a signaling diagram 2 of yet another dual communication card-based communication method according to an embodiment of this application.

FIG. 14 is a signaling diagram 2 of yet another dual communication card-based communication method according to an embodiment of this application. As shown in FIG. 14, the method includes the following steps.

S81: A terminal device sends a first subframe parameter to a network device, where the first subframe parameter is a parameter of a subframe of a second uplink capability; or, the terminal device sends a first timeslot parameter to the network device, where the first timeslot parameter is a parameter of a timeslot of the second uplink capability.

S82: The terminal device sends a second subframe parameter to the network device, where the second subframe parameter is a parameter of a subframe of a third uplink capability; or, the terminal device sends a second timeslot parameter to the network device, where the second timeslot parameter is a parameter of a timeslot of the third uplink capability.

S83: The terminal device communicates with the network device by using a first uplink capability.

S84: The terminal device sends a first message to the network device, where the first message is used to indicate the second uplink capability used by the terminal device to communicate with the network device, and the second uplink capability is different from the first uplink capability.

S85: The network device adjusts an uplink capability between the terminal device and the network device to the second uplink capability in a subframe indicated by the second subframe parameter or in a timeslot indicated by the second timeslot parameter.

Optionally, S86: The network device sends a first response message to the terminal device, where the first response message is used to indicate that the uplink capability between the terminal device and the network device is the second uplink capability.

S87: The terminal device sends a second message to the network device, where the second message is used to indicate the third uplink capability used by the terminal device to communicate with the network device, and the third uplink capability is different from the first uplink capability.

S88: The network device adjusts the uplink capability between the terminal device and the network device to the third uplink capability in the subframe indicated by the second subframe parameter or in the timeslot indicated by the second timeslot parameter.

Optionally, S89: The network device sends a second response message to the terminal device, where the second response message is used to indicate that the uplink capability between the terminal device and the network device is the third uplink capability.

S89a: The terminal device communicates with the network device by using the third uplink capability in the subframe indicated by the second subframe parameter or in the timeslot indicated by the second timeslot parameter, where the third uplink capability is different from the first uplink capability.

For example, for the steps in this embodiment of this application, refer to the steps shown in FIG. 12. Details are not described again. In this embodiment, the network devices are a same network device.

In this embodiment, based on the foregoing embodiments, the terminal device sends the first subframe parameter to a first network device, or the terminal device sends the first timeslot parameter to the network device. The terminal device sends the second subframe parameter to the network device, or the terminal device sends the second timeslot parameter to the network device. Therefore, the terminal device communicates with the first network device by using the second uplink capability in a subframe or a timeslot indicated by the terminal device; and the terminal device communicates with a second network device by using the third uplink capability in a subframe or a timeslot indicated by the terminal device. Therefore, the terminal device may use the second uplink capability in some subframes or timeslots, and use the third uplink capability in another subframe or timeslot.

Figure 15:
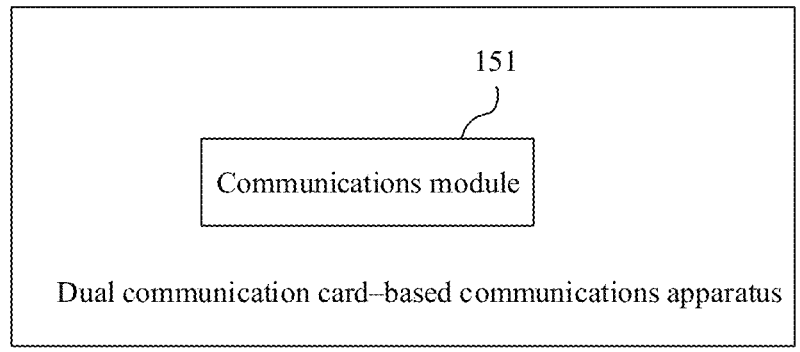
FIG. 15 is schematic block diagram of a dual communication card-based communications apparatus according to an embodiment of this application.

FIG. 15 is schematic block diagram of a dual communication card-based communications apparatus according to an embodiment of this application. The apparatus in this embodiment of this application may be the terminal device in the foregoing method embodiments, or may be one or more chips in the terminal device. A first communication card and a second communication card are disposed in the terminal device. The apparatus may be configured to perform some or all functions of the terminal device in the foregoing method embodiments. The apparatus may include the following units and modules.

A communications module 151 is configured to communicate with a first network device by using a first uplink capability. In this case, the communications module 151 may perform step S101 of the method shown in FIG. 3, or perform step S11 of the method shown in FIG. 4, or perform step S21 of the method shown in FIG. 5. The communications module 151 may perform step S201 of the method shown in FIG. 6, or perform step S31 of the method shown in FIG. 7, or perform step S41 of the method shown in FIG. 8. The communications module 151 may perform step S303 of the method shown in FIG. 9, or perform step S53 of the method shown in FIG. 10, or perform step S63 of the method shown in FIG. 11. The communications module 151 may perform step S403 of the method shown in FIG. 12, or perform step S73 of the method shown in FIG. 13, or perform step S83 of the method shown in FIG. 14.

The communications module 151 is further configured to send a first message to the first network device, where the first message is used to indicate a second uplink capability used by the terminal device to communicate with the first network device, and the second uplink capability is different from the first uplink capability. In this case, the communications module 151 may perform step S102 of the method shown in FIG. 3, or perform step S12 of the method shown in FIG. 4, or perform step S22 of the method shown in FIG. 5. The communications module 151 may perform step S202 of the method shown in FIG. 6, or perform step S32 of the method shown in FIG. 7, or perform step S42 of the method shown in FIG. 8. The communications module 151 may perform step S304 of the method shown in FIG. 9, or perform step S54 of the method shown in FIG. 10, or perform step S64 of the method shown in FIG. 11. The communications module 151 may perform step S404 of the method shown in FIG. 12, or perform step S74 of the method shown in FIG. 13, or perform step S84 of the method shown in FIG. 14.

The communications module 151 is further configured to communicate with a second network device by using a third uplink capability, where the third uplink capability is different from the first uplink capability. In this case, the communications module 151 may perform step S103 of the method shown in FIG. 3, or perform step S15 of the method shown in FIG. 4, or perform step S25 of the method shown in FIG. 5. The communications module 151 may perform step S204 of the method shown in FIG. 6, or perform step S38 of the method shown in FIG. 7, or perform step S48 of the method shown in FIG. 8. The communications module 151 may perform step S306 of the method shown in FIG. 9, or perform step S59a of the method shown in FIG. 10, or perform step S69a of the method shown in FIG. 11. The communications module 151 may perform step S406 of the method shown in FIG. 12, or perform step S79a of the method shown in FIG. 13, or perform step S89a of the method shown in FIG. 14.

Optionally, the second uplink capability is less than the first uplink capability.

Optionally, the communications module 151 is further configured to send a second message to the second network device, where the second message is used to indicate the third uplink capability used by the terminal device to communicate with the second network device. In this case, the communications module 151 may perform step S203 of the method shown in FIG. 6, or perform step S35 of the method shown in FIG. 7, or perform step S45 of the method shown in FIG. 8. The communications module 151 may perform step S305 of the method shown in FIG. 9, or perform step S57 of the method shown in FIG. 10, or perform step S67 of the method shown in FIG. 11. The communications module 151 may perform step S405 of the method shown in FIG. 12, or perform step S77 of the method shown in FIG. 13, or perform step S87 of the method shown in FIG. 14.

Optionally, the communications module 151 is further configured to send a first time parameter to the first network device, where the first time parameter is a time parameter of the second uplink capability. In this case, the communications module 151 may perform step S301 of the method shown in FIG. 9, or perform step S51 of the method shown in FIG. 10, or perform step S61 of the method shown in FIG. 11. Optionally, the communications module 151 is further configured to send a second time parameter to the second network device, where the second time parameter is a time parameter of the third uplink capability. In this case, the communications module 151 may perform step S302 of the method shown in FIG. 9, or perform step S52 of the method shown in FIG. 10, or perform step S62 of the method shown in FIG. 11.

Alternatively, optionally, the communications module 151 is further configured to send a first subframe parameter to the first network device, where the first subframe parameter is a parameter of a subframe of the second uplink capability; or, the terminal device sends a first timeslot parameter to the first network device, where the first timeslot parameter is a parameter of a timeslot of the second uplink capability. In this case, the communications module 151 may perform step S401 of the method shown in FIG. 12, or perform step S71 of the method shown in FIG. 13, or perform step S81 of the method shown in FIG. 14. Optionally, the communications module 151 is further configured to send a second subframe parameter to the second network device, where the second subframe parameter is a parameter of a subframe of the third uplink capability; or, the terminal device sends a second timeslot parameter to the second network device, where the second timeslot parameter is a parameter of a timeslot of the third uplink capability. In this case, the communications module 151 may perform step S402 of the method shown in FIG. 12, or perform step S72 of the method shown in FIG. 13, or perform step S82 of the method shown in FIG. 14.

Optionally, the first uplink capability is N uplink radio frequency link capabilities, the second uplink capability is M uplink radio frequency link capabilities, and the third uplink capability is N-M-P uplink radio frequency link capabilities, where N is a positive integer greater than or equal to 2, M is a positive integer greater than or equal to 1, M is less than N, and P is an integer greater than or equal to 0 and less than N-M.

Optionally, the first communication card corresponds to the first uplink capability and the second uplink capability, and the second communication card corresponds to the third uplink capability.

Optionally, the first network device and the second network device are a same network device, or the first network device and the second network device are different network devices.

The apparatus in the embodiment shown in FIG. 15 may be configured to execute the technical solutions in the embodiments shown in FIG. 3 to FIG. 14 in the foregoing methods. Implementation principles and technical effects of the apparatus are similar to those of the technical solutions. Details are not described herein again.

Figure 16:
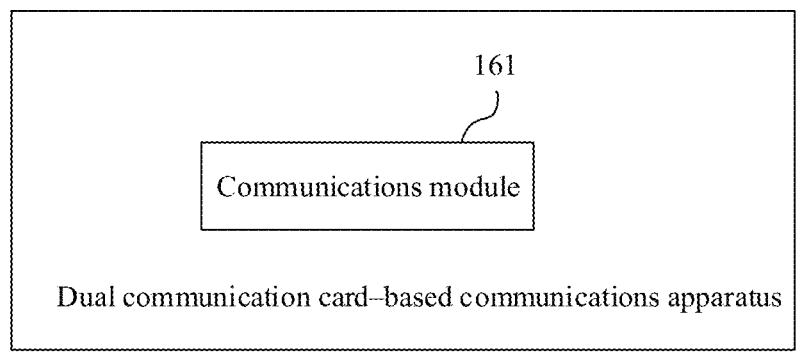
FIG. 16 is a schematic block diagram of another communication processing apparatus according to an embodiment of this application.

FIG. 16 is a schematic block diagram of another communication processing apparatus according to an embodiment of this application. The apparatus in this embodiment of this application may be the network device in the foregoing method embodiments, or may be one or more chips in the network device. The apparatus may be configured to perform some or all functions of the network device in the foregoing method embodiments. The apparatus may include the following units and modules.

A communications module 161 is configured to communicate with a terminal device by using a first uplink capability, where a first communication card and a second communication card are disposed in the terminal device.

The communications module 161 is further configured to receive a first message sent by the terminal device, where the first message is used to indicate a second uplink capability used by the terminal device to communicate with the network device, and the second uplink capability is different from the first uplink capability. In this case, the communications module 161 may perform step S102 of the method shown in FIG. 3, or perform step S12 of the method shown in FIG. 4, or perform step S22 of the method shown in FIG. 5. The communications module 161 may perform step S202 of the method shown in FIG. 6, or perform step S32 of the method shown in FIG. 7, or perform step S42 of the method shown in FIG. 8. The communications module 161 may perform step S304 of the method shown in FIG. 9, or perform step S54 of the method shown in FIG. 10, or perform step S64 of the method shown in FIG. 11. The communications module 161 may perform step S404 of the method shown in FIG. 12, or perform step S74 of the method shown in FIG. 13, or perform step S84 of the method shown in FIG. 14.

Optionally, the second uplink capability is less than the first uplink capability.

Optionally, the communications module 161 is further configured to receive a first time parameter sent by the terminal device, where the first time parameter is a time parameter of the second uplink capability. In this case, the communications module 161 may perform step S301 of the method shown in FIG. 9, or perform step S51 of the method shown in FIG. 10, or perform step S61 of the method shown in FIG. 11.

Optionally, the communications module 161 is further configured to receive a first subframe parameter sent by the terminal device, where the first subframe parameter is a parameter of a subframe of the second uplink capability; or, the network device receives a first timeslot parameter sent by the terminal device, where the first timeslot parameter is a parameter of a timeslot of the second uplink capability. In this case, the communications module 161 may perform step S401 of the method shown in FIG. 12, or perform step S71 of the method shown in FIG. 13, or perform step S81 of the method shown in FIG. 14.

Optionally, the communications module 161 is further configured to communicate with the terminal device by using a third uplink capability, where the third uplink capability is different from the first uplink capability.

Optionally, the communications module 161 is further configured to receive a second message sent by the terminal device, where the second message is used to indicate the third uplink capability used by the terminal device to communicate with the network device. In this case, the communications module 161 may perform step S203 of the method shown in FIG. 6, or perform step S35 of the method shown in FIG. 7, or perform step S45 of the method shown in FIG. 8. The communications module 161 may perform step S305 of the method shown in FIG. 9, or perform step S57 of the method shown in FIG. 10, or perform step S67 of the method shown in FIG. 11. The communications module 161 may perform step S405 of the method shown in FIG. 12, or perform step S77 of the method shown in FIG. 13, or perform step S87 of the method shown in FIG. 14.

Optionally, the communications module 161 is further configured to receive a second time parameter sent by the terminal device, where the second time parameter is a time parameter of the third uplink capability. In this case, the communications module 161 may perform step S302 of the method shown in FIG. 9, or perform step S52 of the method shown in FIG. 10, or perform step S62 of the method shown in FIG. 11.

Optionally, the communications module 161 is further configured to receive a second subframe parameter sent by the terminal device, where the second subframe parameter is a parameter of a subframe of the third uplink capability; or, the network device receives a second timeslot parameter sent by the terminal device, where the second timeslot parameter is a parameter of a timeslot of the third uplink capability. In this case, the communications module 161 may perform step S402 of the method shown in FIG. 12, or perform step S72 of the method shown in FIG. 13, or perform step S82 of the method shown in FIG. 14.

Optionally, the first uplink capability is N uplink radio frequency link capabilities, the second uplink capability is M uplink radio frequency link capabilities, and the third uplink capability is N-M-P uplink radio frequency link capabilities, where N is a positive integer greater than or equal to 2, M is a positive integer greater than or equal to 1, M is less than N, and P is an integer greater than or equal to 0 and less than N-M.

Optionally, the first communication card corresponds to the first uplink capability and the second uplink capability, and the second communication card corresponds to the third uplink capability.

The apparatus in the embodiment shown in FIG. 16 may be configured to execute the technical solutions in the embodiments shown in FIG. 3 to FIG. 14 in the foregoing methods. Implementation principles and technical effects of the apparatus are similar to those of the technical solutions. Details are not described herein again.

Figure 17:
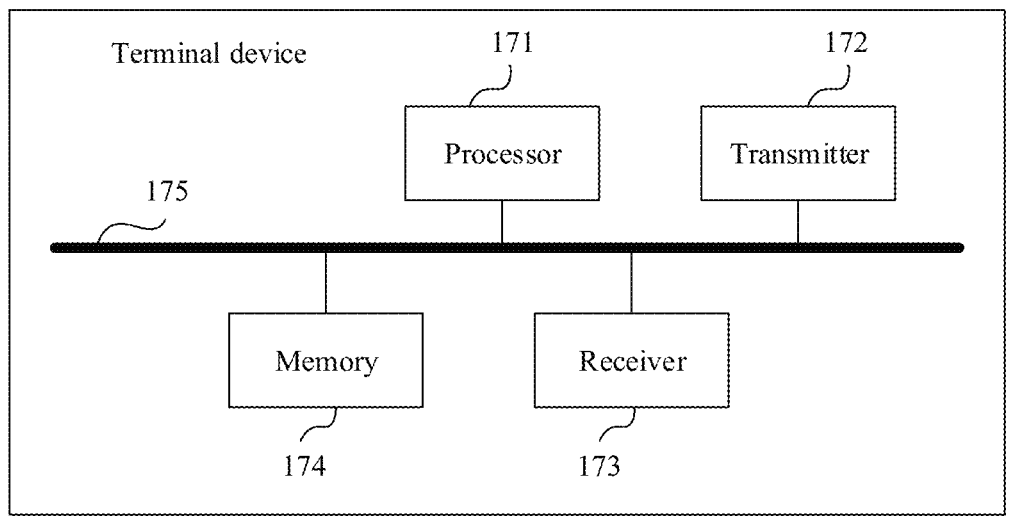
FIG. 17 is a schematic diagram of a structure of a terminal device according to an embodiment of this application.

FIG. 17 is a schematic diagram of a structure of a terminal device according to an embodiment of this application. As shown in FIG. 17, a first communication card and a second communication card are disposed in the terminal device, and the terminal device includes a processor 171, a transmitter 172, and a receiver 173.

The transmitter 172 and the receiver 173 are configured to communicate with a first network device by using a first uplink capability. In this case, the transmitter 172 and the receiver 173 may perform step S101 of the method shown in FIG. 3, or perform step S11 of the method shown in FIG. 4, or perform step S21 of the method shown in FIG. 5. The transmitter 172 and the receiver 173 may perform step S201 of the method shown in FIG. 6, or perform step S31 of the method shown in FIG. 7, or perform step S41 of the method shown in FIG. 8. The transmitter 172 and the receiver 173 may perform step S303 of the method shown in FIG. 9, or perform step S53 of the method shown in FIG. 10, or perform step S63 of the method shown in FIG. 11. The transmitter 172 and the receiver 173 may perform step S403 of the method shown in FIG. 12, or perform step S73 of the method shown in FIG. 13, or perform step S83 of the method shown in FIG. 14.

The transmitter 172 is further configured to send a first message to the first network device, where the first message is used to indicate a second uplink capability used by the terminal device to communicate with the first network device, and the second uplink capability is different from the first uplink capability. In this case, the transmitter 172 may perform step S102 of the method shown in FIG. 3, or perform step S12 of the method shown in FIG. 4, or perform step S22 of the method shown in FIG. 5. The transmitter 172 may perform step S202 of the method shown in FIG. 6, or perform step S32 of the method shown in FIG. 7, or perform step S42 of the method shown in FIG. 8. The transmitter 172 may perform step S304 of the method shown in FIG. 9, or perform step S54 of the method shown in FIG. 10, or perform step S64 of the method shown in FIG. 11. The transmitter 172 may perform step S404 of the method shown in FIG. 12, or perform step S74 of the method shown in FIG. 13, or perform step S84 of the method shown in FIG. 14.

The transmitter 172 and the receiver 173 are further configured to communicate with a second network device by using a third uplink capability, where the third uplink capability is different from the first uplink capability. In this case, the transmitter 172 and the receiver 173 may perform step S103 of the method shown in FIG. 3, or perform step S15 of the method shown in FIG. 4, or perform step S25 of the method shown in FIG. 5. The transmitter 172 and the receiver 173 may perform step S204 of the method shown in FIG. 6, or perform step S38 of the method shown in FIG. 7, or perform step S48 of the method shown in FIG. 8. The transmitter 172 and the receiver 173 may perform step S306 of the method shown in FIG. 9, or perform step S59a of the method shown in FIG. 10, or perform step S69a of the method shown in FIG. 11. The transmitter 172 and the receiver 173 may perform step S406 of the method shown in FIG. 12, or perform step S79a of the method shown in FIG. 13, or perform step S89a of the method shown in FIG. 14.

Optionally, the second uplink capability is less than the first uplink capability.

Optionally, the transmitter 172 is further configured to send a second message to the second network device, where the second message is used to indicate the third uplink capability used by the terminal device to communicate with the second network device. In this case, the transmitter 172 may perform step S203 of the method shown in FIG. 6, or perform step S35 of the method shown in FIG. 7, or perform step S45 of the method shown in FIG. 8. The transmitter 172 may perform step S305 of the method shown in FIG. 9, or perform step S57 of the method shown in FIG. 10, or perform step S67 of the method shown in FIG. 11. The transmitter 172 may perform step S405 of the method shown in FIG. 12, or perform step S77 of the method shown in FIG. 13, or perform step S87 of the method shown in FIG. 14.

Optionally, the transmitter 172 is further configured to send a first time parameter to the first network device, where the first time parameter is a time parameter of the second uplink capability. In this case, the transmitter 172 may perform step S301 of the method shown in FIG. 9, or perform step S51 of the method shown in FIG. 10, or perform step S61 of the method shown in FIG. 11. Optionally, the transmitter 172 is further configured to send a second time parameter to the second network device, where the second time parameter is a time parameter of the third uplink capability. In this case, the transmitter 172 may perform step S302 of the method shown in FIG. 9, or perform step S52 of the method shown in FIG. 10, or perform step S62 of the method shown in FIG. 11.

Alternatively, optionally, the transmitter 172 is further configured to send a first subframe parameter to the first network device, where the first subframe parameter is a parameter of a subframe of the second uplink capability; or, the terminal device sends a first timeslot parameter to the first network device, where the first timeslot parameter is a parameter of a timeslot of the second uplink capability. In this case, the transmitter 172 may perform step S401 of the method shown in FIG. 12, or perform step S71 of the method shown in FIG. 13, or perform step S81 of the method shown in FIG. 14. Optionally, the transmitter 172 is further configured to send a second subframe parameter to the second network device, where the second subframe parameter is a parameter of a subframe of the third uplink capability; or, the terminal device sends a second timeslot parameter to the second network device, where the second timeslot parameter is a parameter of a timeslot of the third uplink capability. In this case, the transmitter 172 may perform step S402 of the method shown in FIG. 12, or perform step S72 of the method shown in FIG. 13, or perform step S82 of the method shown in FIG. 14.

Optionally, the first uplink capability is N uplink radio frequency link capabilities, the second uplink capability is M uplink radio frequency link capabilities, and the third uplink capability is N-M-P uplink radio frequency link capabilities, where N is a positive integer greater than or equal to 2, M is a positive integer greater than or equal to 1, M is less than N, and P is an integer greater than or equal to 0 and less than N-M.

Optionally, the first communication card corresponds to the first uplink capability and the second uplink capability, and the second communication card corresponds to the third uplink capability.

Optionally, the first network device and the second network device are a same network device, or the first network device and the second network device are different network devices.

The processor 171 may be configured to perform a processing process of the terminal device in the foregoing method embodiments, or a program of the units and modules in the embodiment shown in FIG. 15. The processor 171 invokes the program to perform operations in the foregoing method embodiments, to implement the units and modules shown in FIG. 15.

Optionally, the terminal device may further include a memory 174. The memory 174 is configured to store program code and data of the terminal device.

Optionally, the terminal device may further include a bus 175. The processor 171, the transmitter 172, the receiver 173, and the memory 174 may be connected to each other by using the bus 175. The bus 175 may be a PCI bus, an EISA bus, or the like. The bus 174 may be a peripheral component interconnect (peripheral component interconnect, PCI) bus, an extended industry standard architecture (extended industry standard architecture, EISA) bus, or the like. For ease of representation, only one thick line is used to represent the bus in FIG. 17, but this does not mean that there is only one bus or only one type of bus.

In the embodiments of this application, refer to each other for the foregoing embodiments. Same or similar steps and nouns are not described one by one again.

Alternatively, some or all of the foregoing modules may be implemented in a form of an integrated circuit that is embedded in a chip of the terminal device. In addition, they may be separately implemented, or may be integrated together. The foregoing modules may be configured as one or more integrated circuits for implementing the foregoing method, for example, one or more application-specific integrated circuits (Application Specific Integrated Circuit, ASIC), one or more microprocessors (digital signal processor, DSP), or one or more field programmable gate arrays (Field Programmable Gate Array, FPGA).

Figure 18:
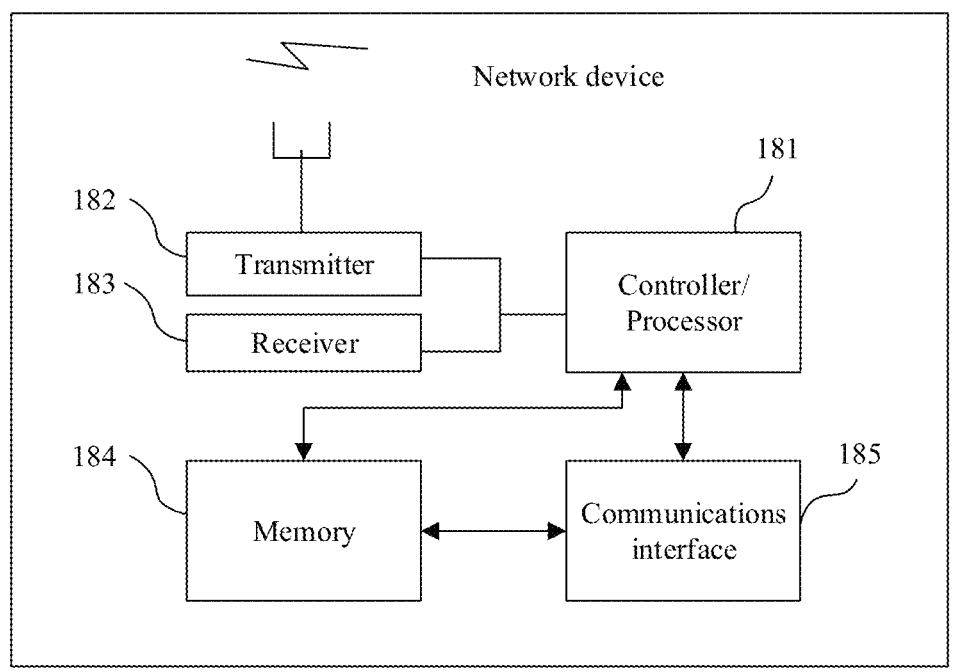
FIG. 18 is a schematic diagram of a structure of a network device according to an embodiment of this application.

FIG. 18 is a schematic diagram of a structure of a network device according to an embodiment of this application. As shown in FIG. 18, the network device includes a processor 181, a transmitter 182, and a receiver 183.

The transmitter 182 and the receiver 183 are configured to communicate with a terminal device by using a first uplink capability, where a first communication card and a second communication card are disposed in the terminal device.

The receiver 183 is further configured to receive a first message sent by the terminal device, where the first message is used to indicate a second uplink capability used by the terminal device to communicate with the network device, and the second uplink capability is different from the first uplink capability. In this case, the receiver 183 may perform step S102 of the method shown in FIG. 3, or perform step S12 of the method shown in FIG. 4, or perform step S22 of the method shown in FIG. 5. The receiver 183 may perform step S202 of the method shown in FIG. 6, or perform step S32 of the method shown in FIG. 7, or perform step S42 of the method shown in FIG. 8. The receiver 183 may perform step S304 of the method shown in FIG. 9, or perform step S54 of the method shown in FIG. 10, or perform step S64 of the method shown in FIG. 11. The receiver 183 may perform step S404 of the method shown in FIG. 12, or perform step S74 of the method shown in FIG. 13, or perform step S84 of the method shown in FIG. 14.

Optionally, the second uplink capability is less than the first uplink capability.

Optionally, the receiver 183 is further configured to receive a first time parameter sent by the terminal device, where the first time parameter is a time parameter of the second uplink capability. In this case, the receiver 183 may perform step S301 of the method shown in FIG. 9, or perform step S51 of the method shown in FIG. 10, or perform step S61 of the method shown in FIG. 11.

Optionally, the receiver 183 is further configured to receive a first subframe parameter sent by the terminal device, where the first subframe parameter is a parameter of a subframe of the second uplink capability; or, the network device receives a first timeslot parameter sent by the terminal device, where the first timeslot parameter is a parameter of a timeslot of the second uplink capability. In this case, the receiver 183 may perform step S401 of the method shown in FIG. 12, or perform step S71 of the method shown in FIG. 13, or perform step S81 of the method shown in FIG. 14.

Optionally, the transmitter 182 and the receiver 183 are further configured to communicate with the terminal device by using a third uplink capability, where the third uplink capability is different from the first uplink capability.

Optionally, the receiver 183 is further configured to receive a second message sent by the terminal device, where the second message is used to indicate the third uplink capability used by the terminal device to communicate with the network device. In this case, the receiver 183 may perform step S203 of the method shown in FIG. 6, or perform step S35 of the method shown in FIG. 7, or perform step S45 of the method shown in FIG. 8. The receiver 183 may perform step S305 of the method shown in FIG. 9, or perform step S57 of the method shown in FIG. 10, or perform step S67 of the method shown in FIG. 11. The receiver 183 may perform step S405 of the method shown in FIG. 12, or perform step S77 of the method shown in FIG. 13, or perform step S87 of the method shown in FIG. 14.

Optionally, the receiver 183 is further configured to receive a second time parameter sent by the terminal device, where the second time parameter is a time parameter of the third uplink capability. In this case, the receiver 183 may perform step S302 of the method shown in FIG. 9, or perform step S52 of the method shown in FIG. 10, or perform step S62 of the method shown in FIG. 11.

Optionally, the receiver 183 is further configured to receive a second subframe parameter sent by the terminal device, where the second subframe parameter is a parameter of a subframe of the third uplink capability; or, the network device receives a second timeslot parameter sent by the terminal device, where the second timeslot parameter is a parameter of a timeslot of the third uplink capability. In this case, the receiver 183 may perform step S402 of the method shown in FIG. 12, or perform step S72 of the method shown in FIG. 13, or perform step S82 of the method shown in FIG. 14.

Optionally, the first uplink capability is N uplink radio frequency link capabilities, the second uplink capability is M uplink radio frequency link capabilities, and the third uplink capability is N-M-P uplink radio frequency link capabilities, where N is a positive integer greater than or equal to 2, M is a positive integer greater than or equal to 1, M is less than N, and P is an integer greater than or equal to 0 and less than N-M.

Optionally, the first communication card corresponds to the first uplink capability and the second uplink capability, and the second communication card corresponds to the third uplink capability.

The processor 181 may be configured to perform a processing process of the network device in the foregoing method embodiments, or a program of the units and modules in the embodiment shown in FIG. 16. The processor 181 invokes the program to perform operations in the foregoing method embodiments, to implement the units and modules shown in FIG. 16.

Optionally, the network device may further include a memory 184. The memory 184 is configured to store program code and data of the network device.

In the embodiments of this application, refer to each other for the foregoing embodiments. Same or similar steps and nouns are not described one by one again.

The processor 181 may alternatively be a controller, and is represented as the "controller/processor 181" in FIG. 18. The receiver 183 and the transmitter 184 are configured to support the network device in transmitting information to and receiving information from the terminal device in the foregoing embodiments, and support radio communication between the network device and another network device. Optionally, the processor 181 performs various functions for communicating with the terminal device.

In addition, the network device may further include a communications interface 185. The communications interface 185 is configured to support the network device in communicating with another network entity.

The processor 181, for example, a central processing unit (central processing unit, CPU), may be one or more integrated circuits configured to implement the foregoing methods, for example, one or more specific integrated circuits, one or more microprocessors, or one or more field programmable gate arrays. The memory 182 may be a memory, or may be a general name of a plurality of storage elements.

An embodiment of this application further provides a computer-readable storage medium, including instructions. When the instructions are run on a computer, the computer may perform the methods provided in FIG. 3 to FIG. 14.

An embodiment of this application provides a communications system. The communications system includes the terminal device provided in FIG. 17 and the network device provided in FIG. 18.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (Digital Subscriber Line, DSL)) or wireless (for example, infrared, radio, and microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (Solid State Disk, SSD)), or the like.

A person skilled in the art should be aware that in the foregoing one or more examples, the functions described in the embodiments of this application may be implemented by using hardware, software, firmware, or any combination thereof. When the functions are implemented by using software, the functions may be stored in a computer-readable medium or transmitted as one or more instructions or code in a computer-readable medium. The computer-readable medium includes a computer storage medium and a communication medium, where the communication medium includes any medium that facilitates transmission of a computer program from one place to another place. The storage medium may be any available medium accessible to a general-purpose or special-purpose computer.

What is claimed is:

1. A communication method, comprising:
   communicating between a terminal device and a first network device via a first uplink capability, wherein the terminal device includes a first communication card and a second communication card;
   sending a first message to the first network device from the terminal device, wherein the first message indicates a second uplink capability to communicate between the terminal device and the first network device; and
   communicating between the terminal device and a second network device via a third uplink capability,
   wherein
   the second uplink capability is less than the first uplink capability,
   the third uplink capability is different from the first uplink capability, and
   the first uplink capability indicates a first quantity of uplink radio frequency links, the second uplink capability indicates a second quantity of uplink radio frequency links, and the third uplink capability indicates a third quantity of uplink radio frequency links.

2. The method according to claim 1, wherein a first throughput of the first uplink capability is greater than a second throughput of the second uplink capability.

3. The method according to claim 1, wherein the method further comprises:
   sending a second message to the second network device from the terminal device, wherein the second message indicates the third uplink capability.

4. The method according to claim 1, wherein the method further comprises:
   sending a first time parameter to the first network device from the terminal device, wherein the first time parameter is a time parameter of the second uplink capability.

5. The method according to claim 1, wherein the method further comprises:
   sending a second time parameter to the second network device from the terminal device, wherein the second time parameter is a time parameter of the third uplink capability.

6. The method according to claim 1, wherein the method further comprises:
   sending a first subframe parameter to the first network device from the terminal device, wherein the first subframe parameter is a parameter of a subframe of the second uplink capability.

7. The method according to claim 1, wherein the method further comprises:
   sending a second subframe parameter to the second network device from the terminal device, wherein the second subframe parameter is a parameter of a subframe of the third uplink capability.

8. The method according to claim 1, wherein the first uplink capability is N uplink radio frequency link capabilities, the second uplink capability is M uplink radio frequency link capabilities, and the third uplink capability is N-M-P uplink radio frequency link capabilities, wherein N is a positive integer greater than or equal to 2, M is a positive integer greater than or equal to 1, M is less than N, and P is an integer greater than or equal to 0 and less than N−M.

9. The method according to claim 1, wherein the first communication card corresponds to the first uplink capability and the second uplink capability, and the second communication card corresponds to the third uplink capability.

10. The method according to claim 1, wherein the first network device and the second network device are on a network accessible to the first network device and the second network device.

11. A dual communication card-based communication method, comprising:
communicating between a network device and a terminal device via a first uplink capability, wherein a first communication card and a second communication card are included in the terminal device; and
receiving a first message at the network device from the terminal device, wherein the first message indicates a second uplink capability to communicate between the terminal device and the network device, wherein
the second uplink capability is less than the first uplink capability,
the first uplink capability indicates a first quantity of uplink radio frequency links, and
the second uplink capability indicates a second quantity of uplink radio frequency links.

12. The method according to claim 11, wherein a first throughput of the first uplink capability is greater than a second throughput of the second uplink capability.

13. The method according to claim 11, wherein the method further comprises:
receiving a first time parameter at the network device from the terminal device, wherein the first time parameter is a time parameter of the second uplink capability.

14. The method according to claim 11, wherein the method further comprises:
receiving a first subframe parameter from the terminal device, wherein the first subframe parameter is a parameter of a subframe of the second uplink capability.

15. The method according to claim 11, wherein the method further comprises:
communicating between the network device and the terminal device via a third uplink capability.

16. The method according to claim 11, wherein the method further comprises:
receiving a second message at the network device from the terminal device, wherein the second message indicates a third uplink capability to communicate between the terminal device and the network device.

17. The method according to claim 15, wherein the method further comprises:
receiving a second time parameter at the network device from the terminal device, wherein the second time parameter is a time parameter of the third uplink capability.

18. The method according to claim 15, wherein the method further comprises:
receiving a second subframe parameter at the network device from the terminal device, wherein the second subframe parameter is a parameter associated with a subframe of the third uplink capability.

19. The method according to claim 15, wherein the first uplink capability is N uplink radio frequency link capabilities, the second uplink capability is M uplink radio frequency link capabilities, and the third uplink capability is N-M-P uplink radio frequency link capabilities, wherein N is a positive integer greater than or equal to 2, M is a positive integer greater than or equal to 1, M is less than N, and P is an integer greater than or equal to 0 and less than N-M.

20. A terminal device, comprising:
a processor and a memory having instructions stored thereon that, when executed by the processor, cause the terminal device to:
communicate with a first network device via a first uplink capability;
send a first message to the first network device, wherein the first message indicates a second uplink capability for communication between the terminal device and the first network device, wherein the second uplink capability is less than the first uplink capability; and
communicate with a second network device via a third uplink capability, wherein the third uplink capability is different from the first uplink capability,
wherein the first uplink capability indicates a first quantity of uplink radio frequency links, the second uplink capability indicates a second quantity of uplink radio frequency links, and the third uplink capability indicates a third quantity of uplink radio frequency links.

* * * * *